United States Patent
Hariri et al.

(10) Patent No.: US 12,361,211 B2
(45) Date of Patent: Jul. 15, 2025

(54) TRACKING ATTRIBUTION OF CONTENT IN AN ONLINE COLLABORATIVE ELECTRONIC DOCUMENT

(71) Applicant: Google LLC, Mountain View, CA (US)

(72) Inventors: Behnoosh Hariri, New York, NY (US); Julie Mond, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/123,891

(22) Filed: Mar. 20, 2023

(65) Prior Publication Data
US 2023/0229857 A1 Jul. 20, 2023

Related U.S. Application Data

(63) Continuation of application No. 16/627,899, filed as application No. PCT/US2019/026370 on Apr. 8, 2019, now Pat. No. 11,645,455.

(51) Int. Cl.
| | |
|---|---|
| *G06F 17/00* | (2019.01) |
| *G06F 40/169* | (2020.01) |
| *G06F 40/194* | (2020.01) |
| *G06F 40/197* | (2020.01) |

(52) U.S. Cl.
CPC .......... *G06F 40/197* (2020.01); *G06F 40/169* (2020.01); *G06F 40/194* (2020.01)

(58) Field of Classification Search
CPC ..... G06F 40/197; G06F 40/194; G06F 40/169
See application file for complete search history.

(56) References Cited

U.S. PATENT DOCUMENTS

| | | | |
|---|---|---|---|
| 8,392,356 B2 * | 3/2013 | Stoner | H04L 25/20 707/602 |
| 8,619,090 B2 * | 12/2013 | Spada | G06F 40/151 345/581 |

(Continued)

FOREIGN PATENT DOCUMENTS

| | | |
|---|---|---|
| CN | 102999482 A | 3/2013 |
| CN | 104798066 A | 7/2015 |
| CN | 108604155 A | 9/2018 |

OTHER PUBLICATIONS

International Search Report and Written Opinion mailed on Nov. 11, 2019, on application No. PCT/US2019/026370.

(Continued)

*Primary Examiner* — Mohammed H Zuberi
(74) *Attorney, Agent, or Firm* — Lowenstein Sandler LLP

(57) ABSTRACT

An attribution query pertaining to a selected portion of a client model of a collaborative electronic document is received from a client device. The selected portion of the client model corresponds to a first coordinate location within a first coordinate structure of the client model of the collaborative electronic document. A first revision identifier associated with a first change at the first coordinate location of the client model is identified. The first coordinate location corresponds to a second coordinate location within a second coordinate structure of a server model of the collaborative electronic document. Attribution information that is associated with the first revision identifier is retrieved. The attribution information is provided to the client device in response to the attribution query.

20 Claims, 15 Drawing Sheets

(56) References Cited

U.S. PATENT DOCUMENTS

| | | | |
|---|---|---|---|
| 8,745,052 B2* | 6/2014 | Seshadrinathan | G06Q 10/10 |
| | | | 707/736 |
| 9,256,599 B1* | 2/2016 | Payne | G06F 16/27 |
| 9,483,458 B2* | 11/2016 | Presler-Marshall | |
| | | | G06F 40/117 |
| 9,727,550 B2* | 8/2017 | He | G06F 3/04842 |
| 9,824,081 B2* | 11/2017 | Lehmann | G06F 40/18 |
| 10,175,955 B2 | 1/2019 | Woods | |
| 10,664,654 B2* | 5/2020 | Marks | G06F 40/177 |
| 11,036,712 B2 | 6/2021 | Piaseczny et al. | |
| 11,435,874 B2* | 9/2022 | Boucher | G06F 3/0485 |
| 2003/0112273 A1 | 6/2003 | Hadfield | |
| 2005/0033811 A1 | 2/2005 | Bhogal et al. | |
| 2008/0222510 A1 | 9/2008 | Nguyen | |
| 2009/0235181 A1 | 9/2009 | Saliba | |
| 2011/0252312 A1 | 10/2011 | Lemonik et al. | |
| 2014/0032488 A1 | 1/2014 | McAfee et al. | |
| 2014/0372852 A1 | 12/2014 | Rothschiller | |
| 2016/0162461 A1 | 6/2016 | Simon | |
| 2019/0097823 A1 | 3/2019 | Simonyi | |

OTHER PUBLICATIONS

Office Action for Chinese Patent Application No. 201980057904.9, mailed Mar. 26, 2024, 31 Pages.

* cited by examiner

TRACKING ATTRIBUTION OF CONTENT IN AN ONLINE COLLABORATIVE ELECTRONIC DOCUMENT

This application is a continuation application of U.S. patent application Ser. No. 16/627,899, filed Dec. 31, 2019, which is a National Phase of International Application No. PCT/US2019/026370 filed Apr. 8, 2019, the entire contents of all are hereby incorporated by reference in their entirety herein.

TECHNICAL FIELD

Technical Field

Aspects and embodiments of the disclosure relate to electronic documents, and more specifically, to generate an attribution model to track attribution information of content in a collaborative electronic document and to provide the attribution information for presentation at a client device.

Background

Electronic document processing applications (e.g., a word processing application, a spreadsheet application, a presentation application) can be used to manipulate (e.g., create, edit, view, print, etc.) electronic documents. When editing an electronic document, a user changes the content of the electronic document by removing text, entering new text, or otherwise changing the content of the electronic document.

SUMMARY

An aspect of the disclosure provides a method comprising: receiving, by a server hosting a collaborative electronic document, an indication of a first change at a first coordinate location of a client model of the collaborative electronic document, wherein the first coordinate location is within a coordinate structure of the collaborative electronic document; applying the first change at a second coordinate location of a server model of the collaborative electronic document, wherein the second coordinate location of the server model corresponds to the first coordinate location of the client model, and wherein the first change is associated with a first revision identifier; generating an attribution model comprising a coordinate structure that corresponds to at least a portion of the coordinate structure of the collaborative electronic document and includes a third coordinate location that corresponds to the first coordinate location and the second coordinate location; updating the third coordinate location of the attribution model with the first revision identifier; and storing attribution information for the first change in association with the first revision identifier.

Some optional features that may form part of the method are as follows. The method may comprise receiving, from a client device, an attribution query requesting the attribution information associated with the first coordinate location of the client model of the collaborative electronic document. The method may comprise identifying the first revision identifier associated with the third coordinate location of the attribution model using a coordinate identifier of the first coordinate location of the client model of the collaborative electronic document. The method may comprise retrieving, from a data store, the attribution information that is associated with the first revision identifier. The method may comprise providing the attribution information to the client device in response to the attribution query. The indication of the first change at the first coordinate location of the client model of the collaborative electronic document may be provided with a command having a command type. The method may further comprise: determining whether the command type of the command satisfies a command type condition, wherein the attribution model is generated responsive to determining that the command type of the command satisfies the command type condition. The attribution information may comprise an indication of a user account associated with the first change and a timestamp associated with the first change. The method may comprise storing a revision copy of the server model of the collaborative electronic document with the first change at the second coordinate location, wherein the revision copy is associated with the first revision identifier. The generating the attribution model comprising the coordinate structure that corresponds to at least the portion of the coordinate structure of the collaborative electronic document and includes the third coordinate location that corresponds to the first coordinate location and the second coordinate location may comprise: generating the attribution model comprising a coordinate structure that is smaller than the coordinate structure of the collaborative electronic document. The method may comprise receiving, from a client device, a command indicating a change to a coordinate structure of the collaborative electronic document. The method may comprise applying, by the server, the change to the coordinate structure of the collaborative electronic document, wherein the change to the coordinate structure of the collaborative electronic document is associated with a second revision identifier. The method may comprise modifying the coordinate structure of the attribution model to reflect the change to the coordinate structure of the collaborative electronic document, wherein a location of content of the attribution model is adjusted in view of the modified coordinate structure of the attribution model. The method may comprise storing a revision copy of the server model of the collaborative electronic document with the change to the coordinate structure of the collaborative electronic document, wherein the revision copy including the change to the coordinate structure is associated with the second revision identifier. The method may comprise refraining from updating the third coordinate location of the attribution model with the second revision identifier. The method may comprise. The updating of the third coordinate location of the attribution model with the revision identifier may further comprise updating the third coordination location of the attribution model with a coordinate identifier of the third coordinate location, wherein content of the third coordinate location of the attribution model is moved to a fourth coordinate location of the attribution model in view of the adjusted coordinate structure of the attribution model. The method may comprise receiving, by the server, a command indicating a second change at a fifth coordinate location of the client model of the collaborative electronic document. The method may comprise applying the second change at a sixth coordinate location of the server model of the collaborative electronic document in accordance with the command, wherein the sixth coordinate location of the server model corresponds to the fifth coordinate location of the client model, and wherein the second change is associated with a third revision identifier. The method may comprise updating the fourth coordinate location of the attribution model with the second updated revision identifier and a coordinate identifier of the fourth coordinate location. The method may comprise storing attribution information for the second change in association with the third revision identifier in a data store. The method may comprise receiving, from a client device, a request to receive the attribution information associated with the fifth coordinate location of the client model of the collaborative electronic document. The method may comprise identifying the first revision identifier, the third revision identifier, and the coordinate identifier of the third coordinate location that are associated with the fourth coordinate location of the attribution model using a coordinate location of the fifth coordinate location of the client model of the collaborative electronic document. The method may comprise retrieving the attribution information that is associated with the third revision identifier. The method may comprise retrieving a first revision copy of the server model of the collaborative electronic document using the first revision identifier. The method may comprise identifying the first change at the second coordinate location of the server model of the collaborative electronic document using the coordinate identifier of the third coordinate location of the attribution model. The method may comprise providing the attribution information to the client device in response to the request, wherein the attribution information comprises the first change.

An aspect of the disclosure provides a method comprising: receiving, via a graphical user interface (GUI) presented at a client device, a selection by a user of a portion of a client model of a collaborative electronic document, wherein the collaborative electronic document is hosted by a cloud-based document editing system, and wherein the collaborative electronic document is concurrently editable by a plurality of users comprising the user; receiving a user request for attribution information for a change of content within the portion of the client model selected by the user of the plurality of users; and responsive to receiving the user request for the attribution information, presenting, via a graphical user interface element in the GUI, the attribution information comprising a user account identifier of a user that changed the content of the portion of the client model of the collaborative electronic document.

Some optional features that may form part of the method are as follows. The collaborative electronic document may comprise a collaborative spreadsheet document with a coordinate structure comprising one or more rows and one or more columns, wherein the portion of the client model of the collaborative electronic document selected by the user comprises a cell of the collaborative spreadsheet document. Optionally, none of the plurality of users may have invoked a command to track changes applied to the portion of the collaborative electronic document. The method may comprise, responsive to receiving the user request for the attribution information, sending an attribution query to the cloud-based document editing system requesting the attribution information, wherein the attribution query comprises a coordinate identifier of a first coordinate location, wherein the coordinate identifier identifies the portion of the client model of the collaborative electronic document. The method may comprise receiving, via the graphical user interface, a subsequent user request for additional attribution information for another change of content within the portion of the client model selected by the user of the plurality of users. The method may comprise responsive to receiving the subsequent user request for the additional attribution information, presenting, at the graphical user interface element in the GUI, the additional attribution information comprising a user account identifier of a user that provided the other change of the content of the portion of the client mode of the collaborative electronic document.

A further aspect of the disclosure provides a system comprising: a memory; and a processing device, coupled to the memory, the processing device to perform a method according to any aspect or embodiment described herein. A further aspect of the disclosure provides a computer program product (such as a tangible computer-readable medium or a software product which can be downloaded without necessarily being stored for a non-transitory way) comprising instructions that, responsive to execution by a processing device, cause the processing device to perform operations comprising a method according to any aspect or embodiment described herein.

Some optional features that may be incorporated in the system are as follows. The processing device may be configured to receive, from a client device, an attribution query requesting the attribution information associated with the first coordinate location of the client model of the collaborative electronic document. The processing device may be configured to identify the first revision identifier associated with the third coordinate location of the attribution model using a coordinate identifier of the first coordinate location of the client model of the collaborative electronic document. The processing device may be configured to retrieve, from a data store, the attribution information that is associated with the first revision identifier. The processing device may be configured to provide the attribution information to the client device in response to the attribution query. The processing device may be configured such that the indication of the first change at the first coordinate location of the client model of the collaborative electronic document is provided with a command having a command type. The processing device may be configured to determine whether the command type of the command satisfies a command type condition, wherein the attribution model is generated responsive to determining that the command type of the command satisfies the command type condition. The processing device may be configured to store a revision copy of the server model of the collaborative electronic document with the first change at the second coordinate location, wherein the revision copy is associated with the first revision identifier. The processing device may be configured to receive, from a client device, a command indicating a change to a coordinate structure of the collaborative electronic document. The processing device may be configured to apply the change to the coordinate structure of the collaborative electronic document, wherein the change to the coordinate structure of the collaborative electronic document is associated with a second revision identifier. The processing device may be configured to modify the coordinate structure of the attribution model to reflect the change to the coordinate structure of the collaborative electronic document, wherein a location of content of the attribution model is adjusted in view of the modified coordinate structure of the attribution model.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding only.

DETAILED DESCRIPTION

Figure 1:
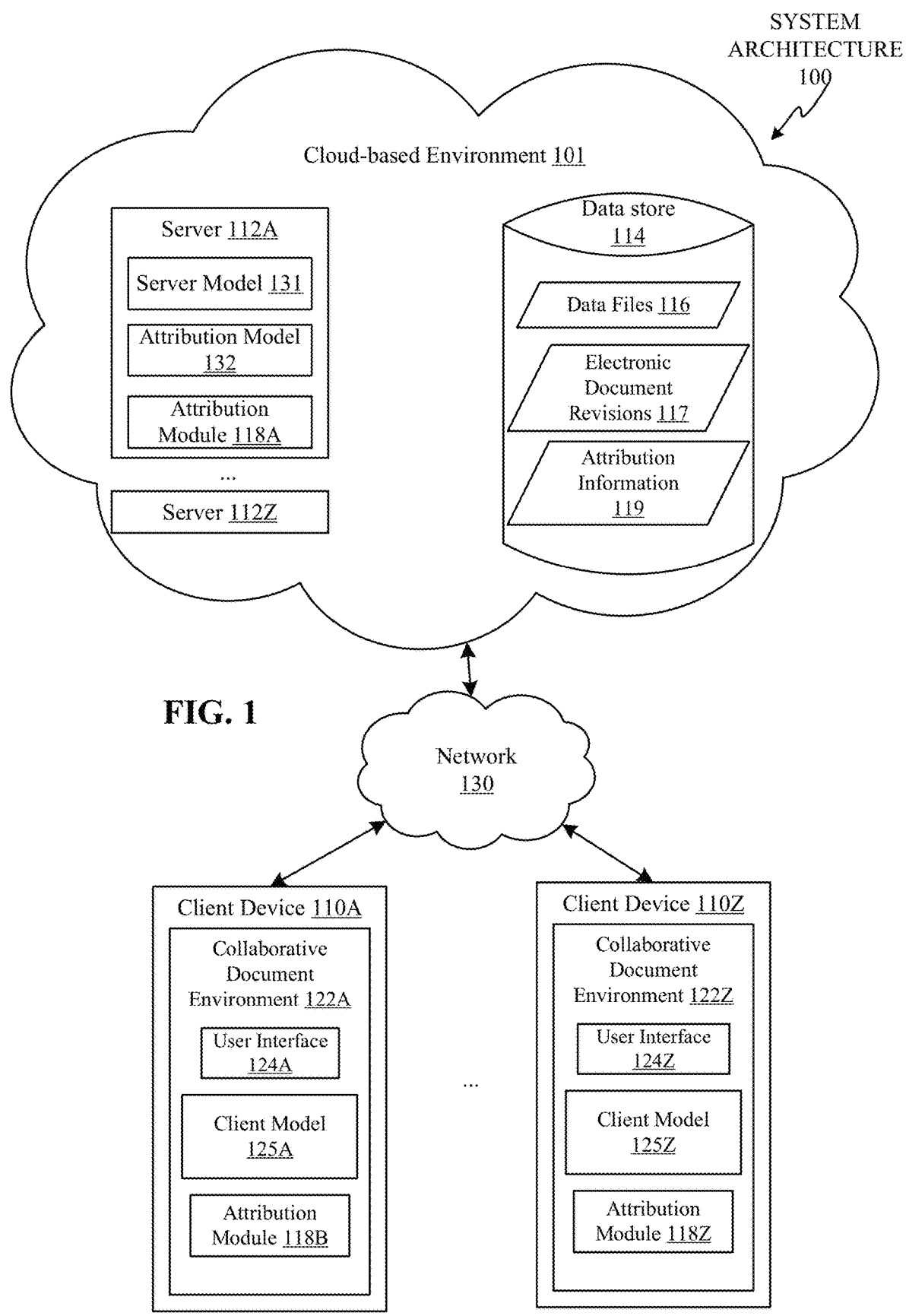
FIG. 1 illustrates an example of a system architecture, in accordance with embodiments of the disclosure.

An electronic document may refer to media content used in electronic form. Media content may include text, tables, videos, audio, images, graphs, slides, charts, software programming code, designs, lists, plans, blueprints, maps, etc. Electronic document processing applications (e.g., a word processing application, a spreadsheet application, a presentation application) can be used to manipulate (e.g., create, edit, view, print, etc.) electronic documents. An electronic document processing application may be a local application hosted by a user device to manipulate local electronic documents stored on the user device. Alternatively, an electronic document processing application can be provided remotely from a client device, for example it may be provided by a cloud-based management platform operating in a cloud-based environment which may enable a user to store data files on one or more servers in a cloud-based environment, synchronize the data files across various devices of the user, and share the data files with one or more other users. In some instances, the cloud-based content management platform may provide a single location to manage the data files for the user. The cloud-based content management platform may enable an author of an electronic document to invite other users to join as collaborators with respect to the electronic document stored at the cloud-based platform. An electronic document to which users have been granted permission to access or edit concurrently may be referred to as a collaborative electronic document herein.

A collaborative electronic document can have a coordinate structure. A coordinate structure can refer to the organization of an object. The coordinate structure allows for elements or locations within the coordinate structure to be identified using coordinate identifiers. For example, a coordinate structure can include many coordinate locations each of which can be identified by a coordinate identifier. For instance, a collaborative spreadsheet document has a coordinate structure that includes a number of rows and a number of columns that are organized in a particular manner such that each cell can be identified by a row-coordinate and a column-coordinate.

A collaborative electronic document can be edited by multiple users either concurrently or at different times. Each of the users of a collaborative electronic document can have a local model (e.g., client model) of the collaborative electronic document at the respective user's client device. The cloud-based document editing system can also include a local model (e.g., server model) of the collaborative electronic document. As users of the collaborative electronic document change the collaborative electronic document, the cloud-based document editing system and the client devices work together so that the local models at the respective client devices and the local model at the cloud-based document editing system are synchronized.

The cloud-based document editing system can implement a revision scheme that assists in synchronization between the local models of the collaborative electronic document. A revision scheme can save the collaborative electronic document (or changes to the collaborative electronic document) as multiple revisions (e.g., versions), where each revision captures the state of the collaborative document at a given instance. For example, as a user changes a respective local model of the collaborative electronic document, the user's client device can send a change request to the cloud-based document editing system. The change request can indicate one or more of the type of change, the value of the change, the location(s) of the change, and the current revision number (e.g., revision 1) of the local model. Responsive to the change request, the cloud-based document editing system can update the server model of the collaborative electronic document, so that the server model reflects the most recent change. The cloud-based document editing system can also save a revision copy of the updated server model of the collaborative electronic document, and associate the revision copy with a revision identifier, such as the current revision (e.g., revision 1). After updating the server model, the cloud-based document editing system can increment the revision number of the server model (e.g., revision 2). The cloud-based document editing system can send a confirmation to the client device that submitted the change request that the change has been applied to the server model.

Responsive to receiving the confirmation, the client device can increment the revision number (revision 2) of the local model. The cloud-based document editing system can send the change to the other client devices. The other client devices can update their respective local models with the change, and increment the current revision number (revision 1) to the next revision (revision 2). As a result, the cloud-based document editing system and the clients have synchronized the content of collaborative electronic document. If any user types another value into a respective local model of the collaborative electronic document, the process can be repeated.

The number of revisions for a particular collaborative electronic document can be numerous over the life-cycle of the document. For instance, to provide real-time changes to the various client devices, the changes that are sent in change requests can be atomic. For example, each word or even each character can be sent to the cloud-based document editing system in a discrete change request. For each change request, the cloud-based document editing system can apply the atomic change and save a revision copy of the collaborative electronic document with the atomic change.

Each revision of the collaborative electronic document can be associated with attribution information (e.g., metadata). Attribution information can refer to information that ascribes an action (e.g., edit) on a collaborative electronic document to a particular user, author, or device, or information that provides context to the action. For example, the attribution information for the revision copy of the collaborative electronic document can include one or more of the author of the change, the timestamp indicating when the cloud-based document editing system applied the change to the server model, the previous value before the change, information in the change request, and so forth.

Tracking attribution information of content in a collaborative electronic document over the life-cycle of the collaborative electronic document, identifying the correct attribution information for a particular coordinate location, and providing the attribution information for presentation at one or more client devices is a beneficial service, but presents several challenges.

In some systems, to identify the correct attribution information, such as author and time, for a particular location of a collaborative electronic document, such as a particular cell in a collaborative spreadsheet document, the system can load each of the revision copies of the collaborative electronic document starting from the most recent revision and check the particular portion of the revision copy to determine whether the particular portion was modified. If it is determined that the particular portion of the revision copy was not modified, the system proceeds to the next most recent revision(s) until the system finds the revision where the particular portion was modified. Once the revision where the particular portion was modified is found, the associated revision identifier can be used to retrieve the corresponding attribution information. The aforementioned process is slow (e.g., minutes), and consumes a large amount of computational, memory, and storage resources.

Additionally, tracking attribution information of content in a collaborative electronic document over the life-cycle of the collaborative electronic document, identifying the correct attribution information for a particular coordinate location, and providing the attribution information for presentation at one or more client devices can also be challenging because a particular location in a collaborative electronic document may not be associated with a universally unique identifier, and the particular location and the contents therein can change and move over the life-cycle of the collaborative electronic document. For example, a user can edit a particular cell of a collaborative spreadsheet document. Over the life-cycle of the collaborative spreadsheet document, the cell and its contents can move many times and be edited many times. For instance, one or more other users can modify the collaborative spreadsheet document by adding columns or deleting rows, which cause the cell and its content to move within the collaborative spreadsheet document. The user can also change the value in the cell before and after the cell moves. As such, locating a particular cell in each revision of a collaborative spreadsheet document and determining attribution information for the particular cell in each revision of the collaborative spreadsheet document can be a computationally intensive and lengthy process.

Aspects of the disclosure address the above and other challenges by generating (e.g. dynamically generating) an attribution model to track attribution information of content in a collaborative electronic document over the life-cycle of the attribution model, using the attribution model to identify attribution information associated with a coordinate location, and providing the attribution information for presentation at one or more client devices. In embodiments, the attribution model can be a light-weight index that tracks attribution information by coordinate locations that move and whose contents change over a life-cycle of the collaborative electronic document.

In some embodiments, a server hosting a collaborative electronic document receives a change request. The change request can include an indication (e.g., as part of a command) of a change to a coordinate location of a client model of the collaborative electronic document. Responsive to receiving the change request, the server can apply the change to the corresponding coordinate location of the server model of the collaborative electronic document. The server can store a revision copy of the server model that includes the latest change and associate the revision copy with the current revision number. The server can also store the attribution information and associate the attribution information with the current revision number. The server can generate (e.g. dynamically generate) an attribution model to track the attribution information. The attribution model can have a coordinate structure that corresponds to the coordinate structure of the collaborative electronic document, and include a coordinate location that corresponds to the coordinate location of the collaborative electronic document where the change was entered.

For example, a collaborative spreadsheet document can have a number of rows and a number of columns that intersect to form cells. The attribution model can also have a number of rows and a number of columns that intersect to form cells. The cells of the collaborative spreadsheet document and the cells of the attribution model can have corresponding coordinate identifiers. For instance, cell A2 within the collaborative spreadsheet document has a corresponding cell A2 within the attribution model located in an equivalent location.

In some embodiments, the server can update the corresponding coordinate location of the attribution model with information (e.g., tracking information) that can be used to track the attribution information for content of the collaborative electronic document over the life-cycle of the collaborative electronic document. The coordinate location of the attribution model that corresponds to the coordinate location at which the change was applied in the server model of the collaborative electronic document can be associated with a revision identifier of a revision copy of the server model at which the change was applied. In some embodiments, the coordinate identifier (e.g., A2) that identifies the coordinate location at which the change was entered can be associated with the corresponding coordinate location of the attribution model. If the same coordinate location of the collaborative electronic document is changed at a later time, the tracking information of the corresponding coordinate location of the attribution model can be updated.

In embodiments, the server can receive an attribution query requesting the attribution information associated with the coordinate location of the client model of the collaborative electronic document. The coordinate identifier that identifies the coordinate location of the client model can also be used to identify the corresponding coordinate location of the attribution model. Responsive to identifying the corresponding coordinate location of the attribution model, the server can retrieve the tracking information associated with the corresponding coordinate location of the attribution model. The tracking information can be used to retrieve the requested attribution information.

For example, a user can request the author and timestamp of the most recent edit at a particular cell in a collaborative spreadsheet document. The server can identify a corresponding cell in the attribution model and retrieve the most recent revision identifier associated with the corresponding cell in the attribution model. The server can use the most recent revision identifier to retrieve the attribution information corresponding to the most recent revision identifier and provide the attribution information to the client device. If the user requests attribution information for the second most recent edit for a particular cell in a collaborative spreadsheet document, the server can retrieve the second most recent revision identifier and retrieve the attribution information associated with the second most recent revision identifier.

In another example, the user can request the value of the cell before the most recent edit. The server can identify the corresponding cell in the attribution model and retrieve the second most recent revision identifier and the coordinate identifier that corresponds to the coordinate location at which the second most recent change was applied in the corresponding revision copy of the server model of the collaborative electronic document. The server can use the second most recent revision identifier to load the corresponding revision copy, and read the value at the coordinate location identified at the coordinate location, which is the value of the cell before the most recent edit.

In some embodiments, if the coordinate structure of the collaborative electronic document changes, the coordinate structure of the attribution model can be similarly changed. For example, if a column is added to the collaborative electronic document, the same column can be added to the attribution model. The coordinate locations of the attribution model can be shifted accordingly, but the contents of the coordinate locations of the attribution model are not adjusted based on a change in the coordinate structure.

In some embodiments, a graphical user interface (GUI) can be presented at a client device. The user can select a portion of the collaborative electronic document. For example, the user can select a cell of a collaborative spreadsheet document. The client can request to receive attribution information for the selected portion of the collaborative electronic document. The server can return the attribution information, which is presented at a graphical user interface element in the GUI at the client device.

As noted, a technical problem addressed by embodiments of the disclosure is the latency in identifying and retrieving the correct attribution information for a coordinate location and providing the attribution information for presentation at a client device or providing the attribution information to other processes or services.

As also noted, another technical problem addressed by embodiments of the disclosure is the use of large amounts of the computational and memory resources in identifying and retrieving attribution information for a coordinate location by loading a series of revision copies to determine which revision copy includes the change at the coordinate location.

Also, another technical problem addressed by embodiments of the disclosure is the inability of a user device to retrieve and present attribution information for a portion of a collaborative electronic document selected by a user.

A technical solution to the above identified technical problems may include: receiving, by a server hosting a collaborative electronic document, an indication of a first change at a first coordinate location of a client model of the collaborative electronic document, wherein the first coordinate location is within a coordinate structure of the collaborative electronic document; applying the first change at a second coordinate location of a server model of the collaborative electronic document in accordance with the command, wherein the second coordinate location of the server model corresponds to the first coordinate location of the client model, and wherein the first change is associated with a first revision identifier; generating an attribution model comprising a coordinate structure that corresponds to at least a portion of the coordinate structure of the collaborative electronic document and includes a third coordinate location that corresponds to the first coordinate location and the second coordinate location; updating the third coordinate location of the attribution model with the first revision identifier; and storing attribution information for the first change in association with the first revision identifier.

A technical solution to the above identified technical problems may include: receiving, via a graphical user interface (GUI) presented at a client device, a selection by a user identifying a portion of a client model of a collaborative electronic document, wherein the collaborative electronic document is hosted by a cloud-based document editing system, and wherein the collaborative electronic document is concurrently editable by a plurality of users; receiving a user request for attribution information for a change of content within the portion of the client model selected by the user; and responsive to receiving the user request for the attribution information, presenting, via a graphical user interface element in the GUI, the attribution information comprising a user identifier of a user that changed the content of the portion of the client model of the collaborative electronic document.

Thus, the technical effect may include reducing the latency in determining the attribution information for a coordinate location and providing the attribution information to a client device or other process or service.

Further technical effects may include reducing the amount of the computational and memory storage resources used to determine attribution information for a coordinate location by loading a series of revision copies to determine which revision copy includes a change at the coordinate location. For example, a technical effect may involve an attribution model and/or a way of embodying the attribution model that gives rise to a smaller, minimized or acceptably small storage requirement or footprint.

Additional technical effects may include allowing a user device to provide attribution information for a portion of a collaborative electronic document selected by a user.

FIG. 1 is an example of a system architecture 100, in accordance with embodiments of the disclosure. The system architecture 100 includes a cloud-based environment 101 connected to client devices 110A-110Z (generally referred to as "client device(s) 110" herein) via a network 130. Although the system architecture 100 is described in the context of a cloud-based environment 101, which may enable communication between servers 112A-112Z (generally referred to as "server(s) 112" herein) in the cloud-based environment 101 and with client devices 110A-110Z over the network 130 to store and share data, it can be understood that the embodiments described herein may also apply to systems that are locally interconnected. In embodiments, the cloud-based environment 101 refers to a collection of physical machines that host applications (e.g., word processing application, spreadsheet application, slide presentation application, webpage application, etc.) providing one or more services (e.g., word processing, spreadsheet processing, slide generation for inclusion in a slide presentation, webpage processing, etc.) to multiple client devices 110A-110Z via the network 130.

The network 130 may be a public network (e.g., the Internet), a private network (e.g., a local area network (LAN) or wide area network (WAN)), or a combination thereof. Network 130 may include a wireless infrastructure, which may be provided by one or more wireless communications systems, such as a wireless fidelity (Wi-Fi) hotspot connected with the network 130 or a wireless carrier system that can be implemented using various data processing equipment, communication towers, etc. Additionally or alternatively, network 130 may include a wired infrastructure (e.g., Ethernet).

The cloud-based environment 101 may include one or more servers 112A-112Z and a data store 114. In embodiments, data store 114 may store data file 116, collaborative electronic document revision 117, and attribution information 119. Contents of the data store 114 may further be described in the subsequent Figures.

In embodiments, data store 114 may store one or more data files 116 that may include content (e.g., text, data tables, images, video, audio, etc.). In one embodiment, the data file 116 may be any suitable data file including content that is uploaded to the cloud-based environment 101 by the client devices 110A-110Z or from a server within or outside of the cloud-based environment 101. In some embodiments, the data file 116 can be an attribution model 132 that is associated with a collaborative electronic document (also referred to as "collaborative document" herein). In an embodiment, the data file 116 may be an electronic document, such as a collaborative electronic document that can be shared with users or be concurrently editable by users. In embodiments, the term "concurrently editable" may refer to users concurrently modifying (e.g., adding, deleting, changing, etc.) content (e.g., text, cells, images, data, slides, etc.), concurrently suggesting changes to the content, concurrently making comments on the content, and the like.

In embodiments, changes to the collaborative electronic documents may be provided to or presented on client devices 110A-110Z in real-time. In embodiments, real-time may refer to the transmission, presentation, or display of changes to a collaborative electronic document to one or more client devices 110 as the changes are being made on different client devices. For example, real-time changes (e.g., edits) to a collaborative electronic document may be displayed on a display of a client device 110A substantially concurrent with a user editing the collaborative electronic document using client device 110Z (at least within the technical limitations of displaying real-time changes, e.g., the user edits to the collaborative electronic document may be displayed within milliseconds of user input and may appear to the receiving user as if in absolute real-time).

In embodiments, the collaborative electronic document may be a collaborative word processing document, a collaborative spreadsheet document, a collaborative slide presentation document, a collaborative webpage document, or any suitable electronic document (e.g., an electronic document including content such as text, data tables, videos, images, graphs, slides, charts, software programming code, designs, lists, plans, blueprints, maps, etc.) that can be shared with users.

The collaborative electronic document may be created by an author and the author may share the collaborative electronic document with other users (e.g., collaborators). Sharing the collaborative electronic document may refer to granting permission to the other users to access (view and/or edit) the collaborative electronic document. Sharing the collaborative electronic document may include informing the other users of the collaborative electronic document via a message (e.g., email, text message, etc.) including a link to the collaborative electronic document. The level of permissions that each user is granted may be based on the user type of each particular user. For example, a user with an editor user type may be able to open the collaborative electronic document and make changes directly to the collaborative electronic document. As such, numerous collaborators may make changes to the content presented in the collaborative electronic document The servers 112A-112Z may be physical machines (e.g., server machines, desktop computers, etc.) that each include one or more processing devices communicatively coupled to memory devices and input/output (I/O) devices. The processing devices may include a computer, microprocessor, logic device or other device or processor that is configured with hardware, firmware, and software to carry out some of the embodiments described herein. Each of the servers 112A-112Z may host an attribution module 118A (generally referred to as "attribution module(s) 118" herein). The attribution module(s) 118A may be implemented as computer instructions that are executable by one or more processing devices on each of the servers 112A-112Z. The attribution module 118A may perform the operations described with respect to the following Figures.

In embodiments, one or more of the servers 112A-112Z may provide a collaborative electronic document environment 122A-122Z (generally referred to as "collaborative electronic document environment(s) 122" herein) to the client devices 110A-110Z. The server 112A-112Z selected to provide the collaborative electronic document environment 122A-122Z may be based on certain load-balancing techniques, service level agreements, performance indicators, or the like. The collaborative electronic document environment 122A-122Z may provide a user interface 124A-124Z that displays a collaborative electronic document generated based on content in one or more data files 116. The collaborative electronic document environment 122A-122Z may enable users using different client devices 110A-110Z to concurrently access the collaborative electronic document to review, edit, view, and/or propose changes to the collaborative electronic document in a respective user interface 124A-124Z.

In an embodiment, the user interfaces 124A-124Z may be web pages rendered by a web browser and displayed on the client devices 110A-110Z in a web browser window. In another embodiment, the user interfaces 124A-124Z may be included in a stand-alone application downloaded to the client devices 110A-110Z and natively running on the client devices 110A-110Z (also referred to as a "native application" or "native client application" herein).

The client devices 110A-110Z may include one or more processing devices communicatively coupled to memory devices and I/O devices. The client devices 110A-110Z may be desktop computers, laptop computers, tablet computers, mobile phones (e.g., smartphones), or any suitable computing device. The client device 110A-110Z may include components, such as an input device and an output device. A user may be authenticated by the server 112A-112Z using a username and password (or other identification information) provided by a user via the user interface 124A-124Z, such that the same client device 110A-110Z may be used by different users at different times.

As discussed above, the client devices 110A-110Z may each include a web browser or a native client application. A user that is invited and becomes a collaborator of the collaborative electronic document may request to access the collaborative electronic document via the web browser or the native client application. For example, the user may select the collaborative electronic document from the user interface 124A provided by the cloud-based environment 101 and presented by the web browser or the native client application. As such, the client device 110A associated with the user may request the collaborative electronic document from the cloud-based environment 101. The collaborative electronic document environment 122A-122Z may enable a user to view and/or manage collaborative electronic documents, with which they are associated, within a respective user interface 124A-124Z.

The collaborative electronic document environment 122A-122Z may also enable users using different client devices 110A-110Z to simultaneously access the collaborative electronic document to comment on, edit (e.g., modify or suggest changes), or view the collaborative electronic document in a respective user interface 124A-124Z of the respective collaborative applications (e.g., collaborative slide presentation application, collaborative word processing application, collaborative spreadsheet application, collaborative webpage application) that presents the collaborative electronic document.

In some embodiments, the attribution module 118B-118Z may be a part of client device 110A-110Z. For example, in some embodiments, the client device 110A-110Z may have a locally installed application including the attribution module 118B-118Z to generate (e.g. dynamically generate) an attribution model to track attribution information of content in a collaborative electronic document and to provide the attribution information to one or more client devices 110A-110Z. Attribution modules 118B-118Z at client devices 110A-110Z can be the same or similar as attribution module(s) 118 at servers 112. In some embodiments, one or more of data file 116, collaborative electronic document revisions 117, or attribution information 119 may be stored local to client devices 110A-110Z. In some embodiments, client devices 110A-110Z may wholly execute attribution modules 118B-118Z to generate an attribution model to track attribution information of content in a collaborative electronic document, identifying the correct attribution information for a particular coordinate location, and to provide the attribution information to one or more client devices 110A-110Z.

In some embodiments, cloud-based environment 101 may wholly execute attribution module(s) 118A to generate an attribution model to track attribution information of content in a collaborative electronic document, identifying the correct attribution information for a particular coordinate location, and to provide the attribution information to one or more client devices 110A-110Z. In other embodiments, operations of attribution modules 118A-118Z may be divided among servers 112A-112Z or client devices 110A-110Z.

As noted above, a collaborative electronic document can have a coordinate structure. A coordinate structure can refer to the organization of an object. The coordinate structure allows for elements or locations within the coordinate structure to be identified using coordinate identifiers. For example, a coordinate structure can include many coordinate locations each of which can be identified by a coordinate identifier. For instance, a collaborative spreadsheet document has a coordinate structure that includes a number of rows and a number of columns that are organized in a particular manner such that each cell can be identified by a row-coordinate and a column-coordinate. A coordinate location can refer to an element or location within the coordinate structure. A coordinate location can store or be associated with content. The coordinate location can be identified by a coordinate identifier (e.g., a row-coordinate and a column-coordinate). The coordinate identifier can identify a position or location within the coordinate structure and reference the position or location of the coordinate location with respect to the coordinate structure. The coordinate identifier can change location within the coordinate structure, and the coordinate location of a given element can change respectively.

In an example, a collaborative word processing document can have a coordinate structure of an array type. It can be noted that different coordinate structures can be used for the same type of collaborative electronic document, and the aforementioned are provided for illustration, rather than limitation.

In some embodiments, each client device stores a client model of the collaborative electronic document. For example, client device 110A stores client model 125A of the collaborative electronic document and client device 110Z stores client model 125Z of the collaborative electronic document (generally referred to as "client model(s) 125" herein). As a user edits a client model 125 at the client device 110, a change request is sent to the server(s) 112. The change request can include a command that can describe the type of change, the location of the change (e.g., coordinate location), and the content of the change, if applicable. For example, if the user enters a value in a cell of a collaborative spreadsheet document, the command "set cell properties" is sent to the server 112 along with the value entered into the cell and the coordinate location of the cell. In embodiments, the changes to the client model(s) 124 that are sent to the server are atomic in nature. For example, each character entered into a collaborative word processing document can be sent to the server 112 as a command. In another example, the values entered into a cell of a collaborative spreadsheet document can be sent to the server 112 as part of a command.

In embodiments, the server 112A can receive a change request from client device 110A. The server 112A can apply the change described by the command in the change request to the server model 131 of the collaborative electronic document. In some embodiments, server 112A can keep a copy (e.g., revision copy) of the current revision (e.g. revision 1) of the collaborative electronic document that includes the added change. The revision copy can be stored at data store 114 as part of the collaborative electronic document revisions 117 (e.g., revision copies). In embodiments, the server can store a revision copy of each revision of the collaborative electronic document.

In embodiments, after the changes are applied to the server model 131 (and in some embodiments, after the revision copy of the current revision (e.g., revision 1) is stored) the server 112A increments the revision number associated with the server model 131 (e.g., revision 2). After applying the changes to the server model 131, server 112 can send a confirmation to client device 110A that indicates that the changes have been applied to the server model 131. It can be noted that the server model 130 can be continually updated so that it reflects the most recent revision of the collaborative electronic document. Client device 110A can update the revision number associated with the client model 125A so that the server model 131 and client model 125A are synchronized. Server 112A can also send the change to client device 110Z. Client device 110Z can update client model 125Z based on the change received from server 112A, and also update the revision number associated with client model 125Z to synchronize the client model 125Z with the server model 130.

In some embodiments, server 112 can generate and update an attribution model 132. The attribution model 132 is associated with the particular server model 131 and can be used to track the attribution of content in a collaborative electronic document and identify attribution information associated with a particular coordinate location of a collaborative electronic document. The attribution model 132, operations of the attribution module 118, and attribution information 119 are further described in conjunction with the following Figures.

In situations in which the systems discussed here collect personal information about users, or may make use of personal information, the users may be provided with an opportunity to control whether the cloud-based environment 101 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the cloud-based environment 101.

Figure 2A:
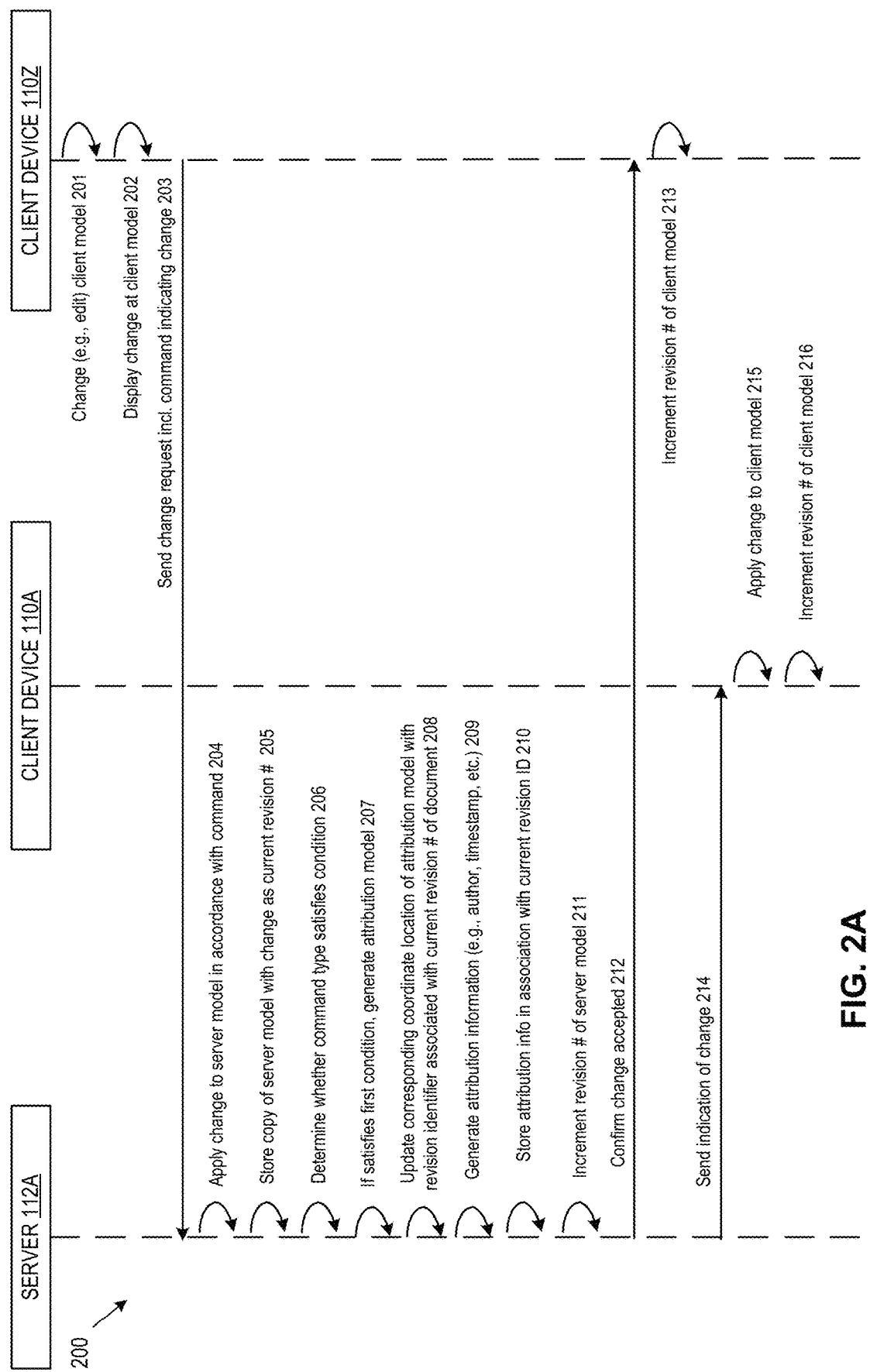
FIG. 2A is a diagram of operations for generating an attribution model, in accordance with embodiments of the disclosure.
Figure 3A:
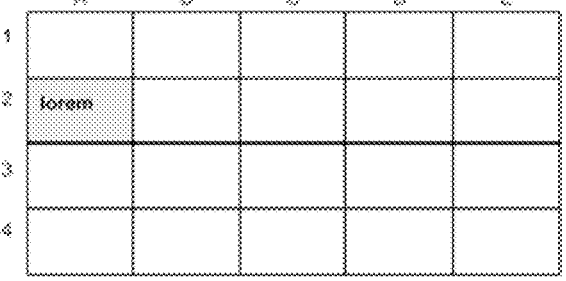
FIG. 3A is a diagram illustrating a server model and an attribution model, in accordance with embodiments of the disclosure.

FIG. 2A is a diagram of operations for generating an attribution model, in accordance with embodiments of the disclosure. System 200 may include similar components as system architecture 100 of FIG. 1. It may be noted that components of FIG. 1 may be used to help describe FIG. 2A. For purposes of illustration, rather than limitation, operations with respect to system 200 are described as performed by attribution module 118A of server 112A, attribution module 118B of client device 110A, attribution module 118Z of client device 110Z, or may be performed by any component thereof, unless otherwise described. The operations described with respect to FIG. 2A are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 3A is a diagram illustrating a server model and an attribution model, in accordance with embodiments of the disclosure. Components of FIG. 3A are used to help describe the operations described with respect to FIG. 2A. A collaborative spreadsheet document is used herein, as an example of a collaborative electronic document for purposes of illustration, rather than limitation. It can be noted that aspects of the present disclosure can be applied to other types of collaborative electronic document, such as, but not limited to collaborative word processing documents and collaborative slide documents.

At operation 201, client device 110Z makes a change to the client model of the collaborative electronic document. As illustrated in FIG. 3A, a user of client device 110Z types a value (e.g., "lorem") into a particular cell, A2, of collaborative spreadsheet document.

At operation 202, the client device 110Z displays the updated client model of the collaborative electronic document that includes the change. For example, client device 110Z, in a graphical user interface (GUI), displays an updated client model of the collaborative spreadsheet document that includes the content "lorum" in cell A2.

At operation 203, client device 110Z sends a change request to server 112A. The change request can include a command that indicates a change to a coordinate location within the coordinate structure of the client model of the collaborative electronic document at client device 110Z. For example, server 112A can receive the change request that includes a command that indicates a change to a particular cell of the client model of the collaborative spreadsheet document stored at client device 110Z.

In some embodiments, the change request can include or be associated with various information. For example, the change request can include or be associated with one or more of a command (e.g., action to be performed), identifier of the revision number of the client model (e.g., current revision at which the changes was made), the content (e.g., value) being entered, location(s) of the change (e.g., coordinate identifiers), session identifier, user identifier, among other information.

In some embodiments, the command can be associated with a command type of multiple command types. For example, a first command type can change a value at a coordinate location within the collaborative electronic document. For instance, the first command type can add a value to a cell in collaborative spreadsheet document. A second command type can change a coordinate structure of collaborative electronic document. For instance, the second command type can add one or more rows or columns to a collaborative spreadsheet document. A third command type can change the format of a value at a coordinate location within the collaborative electronic document. For instance, the third command type can change the font at one cell from a first font type to a second font type. The command types described herein are provided for illustration, rather than limitation. Additional or different command types can be used for any collaborative electronic documents. In embodiments, the server 112A can perform one or more different operations in view of the command type received.

Referring to the current example, server 112A can receive the change request that includes a command (e.g., "set cell properties") of a first command type that indicates a change to a value to a particular cell of the client model of the collaborative spreadsheet document stored at client device 110Z. The change request identifies the coordinate identifier A2, which identifies the coordinate location, cell at A2, of the client model of the collaborative spreadsheet document. The change request also identifies the value of the change ("lorem"), a current revision number of the client model, and a session identifier.

At operation 204, server 112A applies the change at a corresponding coordinate location of a server model of the collaborative electronic document in accordance with the command. In embodiments, the coordinate structure of the client model and the server model of the collaborative electronic document are similar or the same such that a coordinate location of the client model corresponds to the coordinate location of the server model. In some embodiments, the change is associated with a revision identifier. In some embodiments, the revision identifier can identify the revision number that is incremented after the change is applied to the server model of the collaborative electronic document (e.g., operation 211). In some embodiments, the revision identifier identifies the current revision before the revision number is incremented.

For example, in FIG. 3A the user types "lorem" at coordinate location, cell at A2, of the client model of the collaborative spreadsheet document. To apply the change to the server model 310 of the collaborative spreadsheet document, the value, "lorem" is entered into the corresponding coordinate location, cell at A2, of the server model 310 of the collaborative spreadsheet document. The current revision number is revision 1, and the revision identifier can be rev. 1.

At operation 205, server 112A stores a revision copy of the server model of the collaborative electronic document with the applied change at the corresponding coordinate location. The revision copy is associated with the revision identifier. For example, server 112A stores of revision copy of the current state of the server model of the collaborative spreadsheet document that includes the change "lorem" at coordinate location, cell at A2. The server associates the revision copy with the current revision ID, rev. 1.

At operation 206, server 112A determines whether the command type of the command satisfies a command type condition. In some embodiments, to determine whether the command type of the command satisfies a command type condition, the server 112A determines whether the command type is one of predefined command types (e.g., first command type, second command type, third command type, etc.). Responsive to determining that the command type of the command is of a particular command type, server 112A performs a particular action. In the current embodiment, server 112A determines that the command type of the command is a first command type that changes a value at a coordinate location of the collaborative electronic document. For example, the command, "set cell properties," is of a first command type that adds a value to a cell in a collaborative spreadsheet document.

At operation 207, responsive to determining that command type of the command satisfies a command type condition (e.g., is of the first command type), server 112A generates an attribution model. The attribution model tracks attribution of content in a collaborative document. In embodiments, the attribution model includes a coordinate structure that corresponds to a least a portion of the coordinate structure of the collaborative electronic document. The attribution model can include at least a coordinate location that corresponds to the coordinate location of the server model at which the change was applied. The corresponding coordinate location of the attribution model can be identified using the coordinate identifier associated with the coordinate location of the server model at which the change was applied.

In some embodiments, server 112A can generate an attribution model that has a coordinate structure that is smaller than (e.g., includes only a portion of) the coordinate structure of the collaborative electronic document. The attribution model can have a similar coordinate structure, but not include some coordinate locations where no changes have been applied. The smaller attribution model can be an optimization that lessens the amount of storage and memory resources used to generate, save, and load the attribution model.

For example, in FIG. 3A, attribution model 320 is generated to have one column (column A) and four rows (rows 1-4). In contrast, server model 310 of the collaborative spreadsheet document has five columns (columns A-E) and four rows (rows 1-4). The coordinate structure of the attribution model 320 is similar to the server model 310 in that both coordinate structures have the same structure type (e.g., rows and columns) and both include a coordinate structure that can address a corresponding coordinate location with the same coordinate identifier (e.g., A2). The generated attribution model 320 reflects a portion of the server model of the collaborative spreadsheet document, but enough of the coordinate structure of the server model 310 so that the attribution model 320 includes the coordinate location where the change was applied. This approach may be beneficial in reducing the data storage and other resources required to store and use the attribution model 320. It can be noted that the size of the coordinate structure is provided as illustration, rather than limitation. In other embodiments, the coordinate structure of the attribution model 320 could be even smaller by, for example, eliminating rows 3 and 4, or larger by, for example, adding column B.

In other embodiments, the attribution model 320 can have the same coordinate structure (e.g., same dimensions and same number of rows and columns) as the server model of the collaborative electronic document.

At operation 208, server 112A updates the corresponding coordinate location of the attribution model with the revision identifier. For example, in FIG. 3A, server 112A associates the revision identifier, rev. 1, with the coordinate location of the attribution model 320 that corresponds to the coordinate location of the server model 310 at which the change, "lorem," was added to the server model 310. In both the server model 310 and the attribution model 320, the cell at A2 has been adjusted.

At operation 209, server 112A generates attribution information associated with the change to the collaborative electronic document. Attribution information can refer to information that ascribes an action (e.g., edit) on a collaborative electronic document by a particular user or author, or information that provides context to the action. In some embodiments, the attribution information can include one or more of an indication of a user account (with a cloud-based system 101) associated with the change and a timestamp associated with the change. In some embodiments, an indication of a user account associated with the change can include an identifier of the author that made the change to the client model of the collaborative electronic document. In some embodiments, the timestamp associated with the change can indicate the time at which server 112A applied the change to the server model of collaborative electronic document. The timestamp can include one or more of the date of the change (e.g., day, month, or year) or time of the change (e.g., hour, minute, second).

In some embodiments, the attribution information can include more, less, or different information. For example, attribution information can include the value at the coordinate location prior to the change (e.g., content of the cell before the change was applied), as will be further described with respect to FIGS. 6A-6C and 7A-7C. In some embodiments, the client device can generate one or more elements of the attribution information. For example, the change request can include an identifier of the user that made the change to the client model of the collaborative electronic document.

At operation 210, server 112A stores at least some of the attribution information associated with the change to the collaborative electronic document. The attribution information can be associated with the revision identifier of the current revision. For example, in FIG. 3A the attribution information can be stored at a data store (e.g., data store 114) and linked or otherwise associated (e.g., stored together) with the current revision identifier, rev. 1, of the server model of the collaborative spreadsheet document.

At operation 211, server 112A can update the current revision number of the server model of the collaborative electronic document. For example, server 112A increments the revision number of the server model to the next revision number. For instance, server 112A can increment the revision number of the server model from revision 1 (rev. 1) to revision 2 (rev. 2).

At operation 212, server 112A can send an indication to client device 110Z that the change submitted in the change request has been applied to the server model of the collaborative electronic document.

At operation 213, responsive to receiving the indication that the change submitted in the change request has been applied at the server model of the collaborative electronic document, client device 110Z updates the current revision number of the client model of the collaborative electronic document. For example, client device 110Z can increment the revision number of the client model from revision 1 (rev. 1) to revision 2 (rev. 2). After updating the current revision number, the client model of the collaborative electronic document at client device 110Z is synchronized with the server model of the collaborative electronic document.

At operation 214, server 112A sends an indication of the change to client device 110A. For example, the indication of the change can indicate that cell at A2 of the collaborative spreadsheet document has a new value of "lorem."

At operation 215, responsive to receiving the indication of the change, client device 110A applies the change to the client model of the collaborative electronic document at client device 110A. For example, client device 110A applies the value, "lorem," to the cell at A2 of the client model of the collaborative spreadsheet document.

At operation, 216, client device 110A updates the current revision number of the client model of the collaborative electronic document. For example, client device 110A can increment the revision number of the client model from revision 1 (rev. 1) to revision 2 (rev. 2). After updating the current revision number, the client model of the collaborative electronic document at client device 110A is synchronized with the server model of the collaborative electronic document.

Figure 2B:
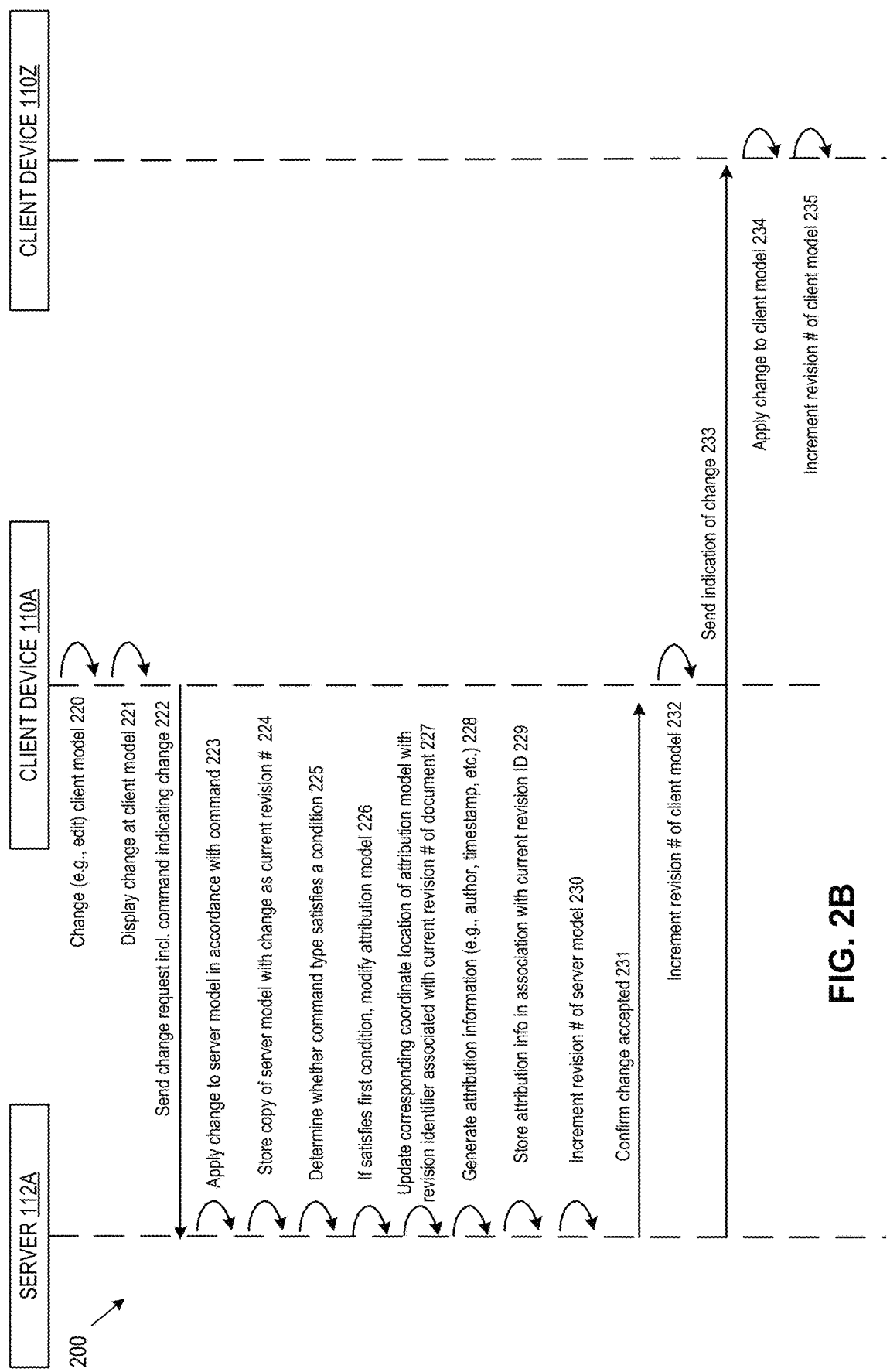
FIG. 2B is a diagram of operations for updating an attribution model, in accordance with embodiments of the disclosure.
Figure 3B:
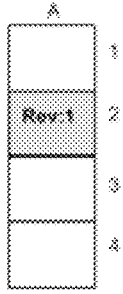
FIG. 3B is a diagram illustrating a server model and an attribution model, in accordance with embodiments of the disclosure.

FIG. 2B is a diagram of operations for generating an attribution model, in accordance with embodiments of the disclosure. System 200 may include similar components as system architecture 100 of FIG. 1. It may be noted that components of FIG. 1 may be used to help describe FIG. 2B. For purposes of illustration, rather than limitation, operations with respect to system 200 are described as performed by attribution module 118A of server 112A, attribution module 118B of client device 110A, attribution module 118Z of client device 110Z, or may be performed by any component thereof, unless otherwise described. The operations described with respect to FIG. 2B are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 3B is a diagram illustrating a server model and an attribution model, in accordance with embodiments of the disclosure. Components of FIG. 3B are used is used to help describe the operations described with respect to FIG. 2B. In embodiments, the operations of FIG. 2B are similar to the operations described with respect to FIG. 2A, and the description with respect to FIG. 2A can be used to provide additional detail to operations described with respect to FIG. 2B.

At operation 220, client device 110A makes a change to the client model of the collaborative electronic document. As illustrated in FIG. 3B, a user of client device 110A types a value (e.g., "ipsum") into a particular cell, cell at D3, of collaborative spreadsheet document.

At operation 221, the client device 110A displays the updated client model of the collaborative electronic document that includes the change. For example, client device 110A, in a GUI, displays an updated client model of the collaborative spreadsheet document that includes the content "ipsum" in a cell at D3.

At operation 222, client device 110A sends a change request to server 112A. The change request can include a command that indicates a change at a coordinate location within the coordinate structure of the client model of the collaborative electronic document at client device 110A. For example, server 112A can receive the change request that includes a command that indicates a change to a particular cell of the client model of the collaborative spreadsheet document stored at client device 110A.

In the current example, server 112A can receive the change request that includes a command (e.g., "set cell properties") of a first command type that indicates a change to a value at a particular cell of the client model of the collaborative spreadsheet document. The change request identifies the coordinate location, cell at D3, of the client model of the collaborative spreadsheet document, the value of the change ("ipsum"), a current revision number (e.g., rev. 2) of the client model, and a session identifier.

At operation 223, server 112A applies the change at a corresponding coordinate location of a server model of the collaborative electronic document in accordance with the command. For example, in FIG. 3B the user types "ipsum" at coordinate location, cell at D3, of the client model of the collaborative spreadsheet document. To apply the change to the server model 310 of the collaborative spreadsheet document, the value, "ipsum" is entered into the corresponding coordinate location, cell at D3, of the server model 310 of the collaborative spreadsheet document. The current revision number is revision 2, and the revision identifier can be rev. 2.

At operation 224, server 112A stores a revision copy of the server model of the collaborative electronic document with the applied change at the corresponding coordinate location. The revision copy is associated with the revision identified. For example, server 112A stores a revision copy of the current state of the server model of the collaborative spreadsheet document that includes the change "ipsum" at coordinate location, cell at D3. The server associates the revision copy with the current revision ID, rev. 2.

At operation 225, server 112A determines whether the command type of the command satisfies a command type condition. In the current embodiment, server 112A determines that the command type of the command is a first command type that adds a value to a coordinate location of the collaborative electronic document. For example, the command, "set cell properties," is of a first command type that adds a value to a cell in collaborative spreadsheet document.

At operation 226, responsive to determining that that command type of the command satisfies a command type condition (e.g., is of the first command type), server 112A modifies the attribution model that is associated with the server model of the collaborative electronic document. In particular, in some embodiments the coordinate structure of the attribution model is modified.

For example, in FIG. 3B, the coordinate structure of the attribution model 320 is modified by adding columns B, C, and D. It is noted that the coordinate structure of the attribution model 320 is still smaller than the coordinate structure of server model 310. The modified attribution model 320 reflects a portion of the server model 310 of the collaborative spreadsheet document, but enough of the coordinate structure of the server model 310 so that the attribution model 320 can include the coordinate location of the change.

At operation 227, server 112A updates the corresponding coordinate location of the attribution model with the current revision identifier. For example, in FIG. 3B, server 112A associates the revision identifier, rev. 2, with coordinate location of the attribution model 320 that corresponds to the coordinate location of the server model 310 at which the change, "ipsum," was added to the server model 310. In both the server model 310 and the attribution model, cells at D3 have been updated, but with different information. It can be noted that the attribution model 320 does not include the value, "ipsum," that has been included in the cell at D3 of the server model 310, which reduces the storage and memory overhead of the attribution model 310.

At operation 228, server 112A generates attribution information for the change to the collaborative electronic document. For example, the attribution information can include the author of the change (e.g., user A of client device 110A) and the timestamp at which server 112A applied the change to the server model 310.

At operation 229, server 112A stores the attribution information for the change in association with the revision identifier of the current revision. For example, in FIG. 3B the attribution information can be stored at a data store (e.g., data store 114) and linked or otherwise associated (e.g., stored together) with the current revision identifier, rev. 2, of the server model of the collaborative spreadsheet document.

At operation 230, server 112A can update the current revision number of the server model of the collaborative electronic document. For example, server 112A can increment the revision number of the server model from revision 2 (rev. 2) to revision 3 (rev. 3).

At operation 231, server 112A can send an indication to client device 110A that the change submitted in the change request has been applied to the server model of the collaborative electronic document.

At operation 232, responsive to receiving the indication that the change submitted in the change request has been applied to the server model, client device 110A updates the current revision number of the client model of the collaborative electronic document. For example, client device 110A can increment the revision number of the client model from revision 2 (rev. 2) to revision 3 (rev. 3). After updating the current revision number, the client model of the collaborative electronic document at client device 110A is synchronized with the server model of the collaborative electronic document.

At operation 233, server 112A sends an indication of the change to the server model to client device 110Z. For example, the indication of the change can indicate that the cell at D3 of the collaborative spreadsheet document has a new value of "ipsum."

At operation 234, responsive to receiving the indication of the change at the server model, client device 110Z applies the change to the client model of the collaborative electronic document at client device 110Z. For example, client device 110Z applies the value, "ipsum," at the cell at D3 of the client model of the collaborative spreadsheet document at client device 110A.

At operation, 235, client device 110Z updates the current revision number of the client model of the collaborative electronic document. For example, client device 110Z can increment the revision number of the client model from revision 2 (rev. 2) to revision 3 (rev. 3). After updating the current revision number, the client model of the collaborative electronic document at client device 110Z is synchronized with the server model of the collaborative electronic document.

Figure 2C:
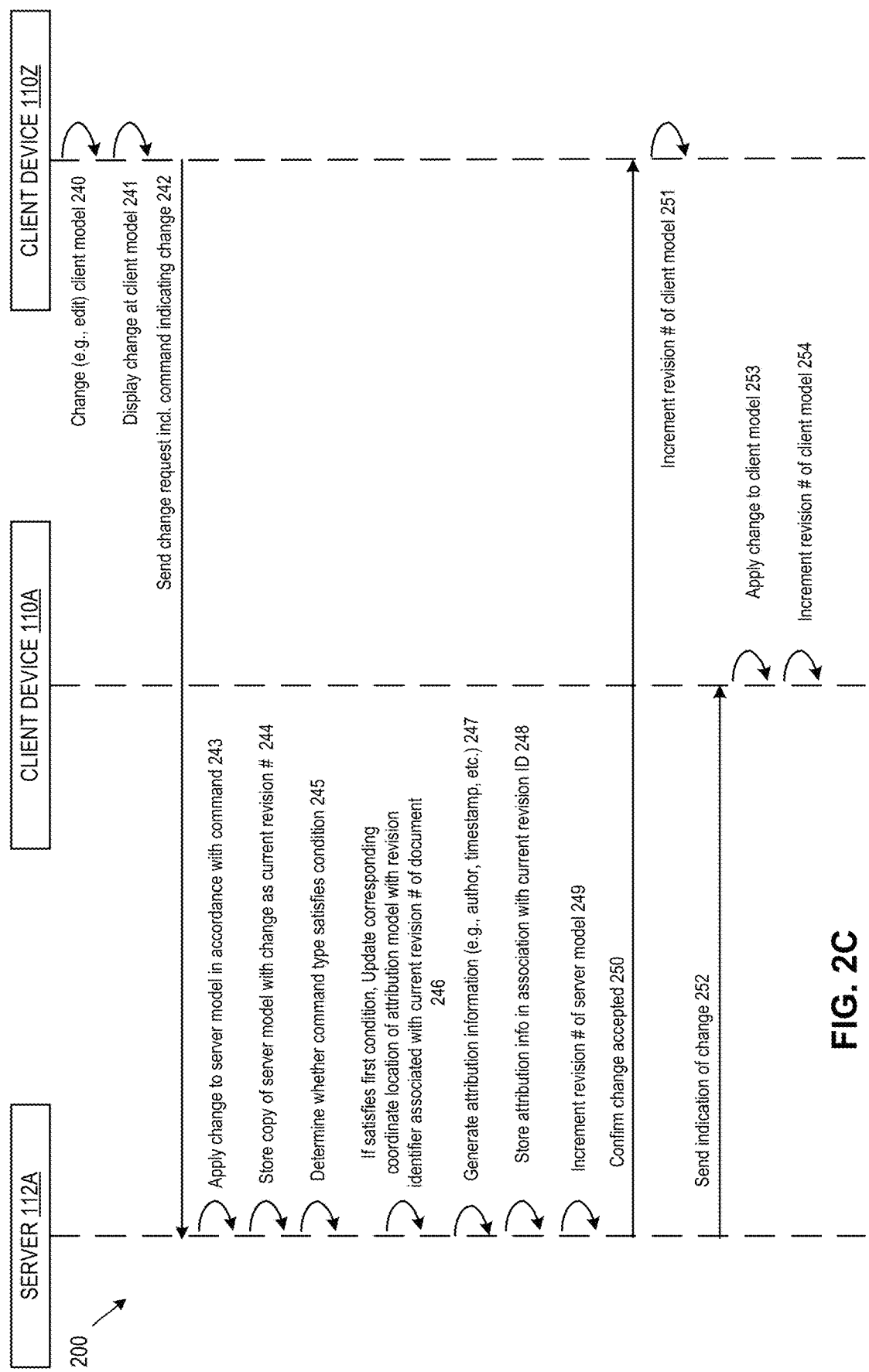
FIG. 2C is a diagram of operations for updating an attribution model, in accordance with embodiments of the disclosure.
Figure 3C:
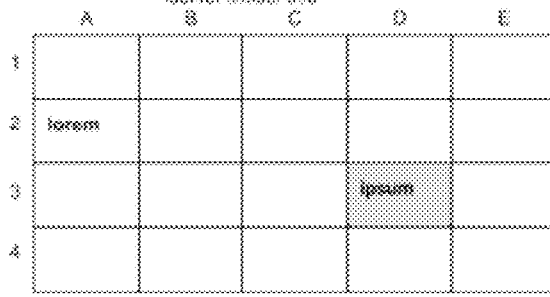
FIG. 3C is a diagram illustrating a server model and an attribution model, in accordance with embodiments of the disclosure.

FIG. 2C is a diagram of operations for updating an attribution model, in accordance with embodiments of the disclosure. System 200 may include similar components as system architecture 100 of FIG. 1. It may be noted that components of FIG. 1 may be used to help describe FIG. 2C. For purposes of illustration, rather than limitation, operations with respect to system 200 are described as performed by attribution module 118A of server 112A, attribution module 118B of client device 110A, attribution module 118Z of client device 110Z, or may be performed by any component thereof, unless otherwise described. The operations described with respect to FIG. 2C are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 3C is a diagram illustrating a server model and an attribution model, in accordance with embodiments of the disclosure. Components of FIG. 3C are used to help describe the operations described with respect to FIG. 2C. In embodiments, the operations of FIG. 2C are similar to the operations described with respect to FIG. 2A, and the description with respect to FIG. 2A can be used to provide additional details of the operation described with respect to FIG. 2C.

At operation 240, client device 110Z makes a change to the client model of the collaborative electronic document. As illustrated in FIG. 3C, a user of client device 110Z types a value (e.g., "Hello") into a particular cell, cell at A2, of collaborative spreadsheet document, which replaces the original value, "lorem."

At operation 241, the client device 110Z displays the updated client model of the collaborative electronic document that includes the change. For example, client device 110Z, in a GUI, displays an updated client model of the collaborative spreadsheet document that includes the content "Hello" in the cell at A2.

At operation 242, client device 110Z sends a change request to server 112A. The change request can include a command that indicates a change at a coordinate location within the coordinate structure of the client model of the collaborative electronic document at client device 110Z. For example, server 112A can receive the change request that includes a command that indicates a change to a particular cell of the client model of the collaborative spreadsheet document stored at client device 110Z.

In the current example, server 112A can receive the change request that includes a command (e.g., "set cell properties") of a first command type that indicates a change to a value at a particular cell of the client model of the collaborative spreadsheet document. The change request identifies the coordinate location, cell at A2, of the client model of the collaborative spreadsheet document, the value of the change ("Hello"), a current revision number of the client model, and a session identifier.

At operation 243, server 112A applies the change at a corresponding coordinate location of a server model of the collaborative electronic document in accordance with the command. For example, in FIG. 3C the user types "Hello" at coordinate location, cell at A2, of the client model of the collaborative spreadsheet document. To apply the change to the server model 310 of the collaborative spreadsheet document, the server 112A replaces the value, "lorem," with the new value, "Hello." "Hello" is entered into the corresponding coordinate location, cell at A2, of the server model 310 of the collaborative spreadsheet document. The current revision number is revision 3, and the revision identifier can be rev. 3.

At operation 244, server 112A stores a revision copy of the server model of the collaborative electronic document with the applied change at the corresponding coordinate location. The revision copy is associated with the revision identifier. For example, server 112A stores a revision copy of the current state of the server model of the collaborative spreadsheet document that includes the change "Hello" at coordinate location, cell at A2. The server associates the revision copy with the current revision ID, rev. 3.

At operation 245, server 112A determines whether the command type of the command satisfies a command type condition. In the current embodiment, server 112A determines that the command type of the command is a first command type that adds a value to a coordinate location of the collaborative electronic document. For example, the command, "set cell properties," is of a first command type that adds or changes a value to a cell in collaborative spreadsheet document.

At operation 246, responsive to determining that that command type of the command satisfies a command type condition (e.g., is of the first command type), server 112A updates the corresponding coordinate location of the attribution model with the revision identifier. For example, in FIG. 3B, server 112A associates the current revision identifier, rev. 3, at a coordinate location of the attribution model 320 that corresponds to the coordinate location of the server model 310 with the change, "Hello." As illustrated, coordination location, cell at A2, of attribution model 320 includes two revision identifiers, rev. 1 and rev. 3. It can be noted that since the attribution model 320 already includes cell at A2, the coordinate structure of the attribution model 320 does not need to be modified again.

At operation 247, server 112A generates attribution information for the change to the collaborative electronic document.

At operation 248, server 112A stores the attribution information for the change in association with the revision identifier of the current revision. For example, in FIG. 3C the attribution information can be stored at a data store (e.g., data store 114) and linked or otherwise associated with (stored together with) the current revision identifier, rev. 3, of the server model of the collaborative spreadsheet document.

At operation 249, server 112A can update the current revision number of the server model of the collaborative electronic document. For example, server 112A can increment the revision number of the server model from revision 3 (rev. 3) to revision 4 (rev. 4).

At operation 250, server 112A can send an indication to client device 110Z that the change submitted in the change request has been applied to the server model of the collaborative electronic document.

At operation 251, responsive to receiving the indication that the change submitted in the change request has been applied to the server model of the collaborative electronic document, client device 110Z updates the current revision number of the client model of the collaborative electronic document. For instance, client device 110Z can increment the revision number of the client model from revision 3 (rev. 3) to revision 4 (rev. 4). After updating the current revision number, the client model of the collaborative electronic document at client device 110Z is synchronized with the server model of the collaborative electronic document.

At operation 252, server 112A sends an indication of the change to the server model to client device 110A. For example, the indication of the change can indicate that the cell at A2 of the collaborative spreadsheet document has a new value of "Hello" that replaces the old value, "ipsum."

At operation 253, responsive to receiving the indication of the change to the server model, client device 110A applies the change to the client model of the collaborative electronic document at client device 110A. For example, client device 110A applies the value, "Hello," to the cell at A2 of the client model of the collaborative spreadsheet document at client device 110A.

At operation, 254, client device 110A updates the current revision number of the client model of the collaborative electronic document. For example, client device 110A can increment the revision number of the client model from revision 3 (rev. 3) to revision 4 (rev. 4). After updating the current revision number, the client model of the collaborative electronic document at client device 110A is synchronized with the server model of the collaborative electronic document.

Figure 2D:
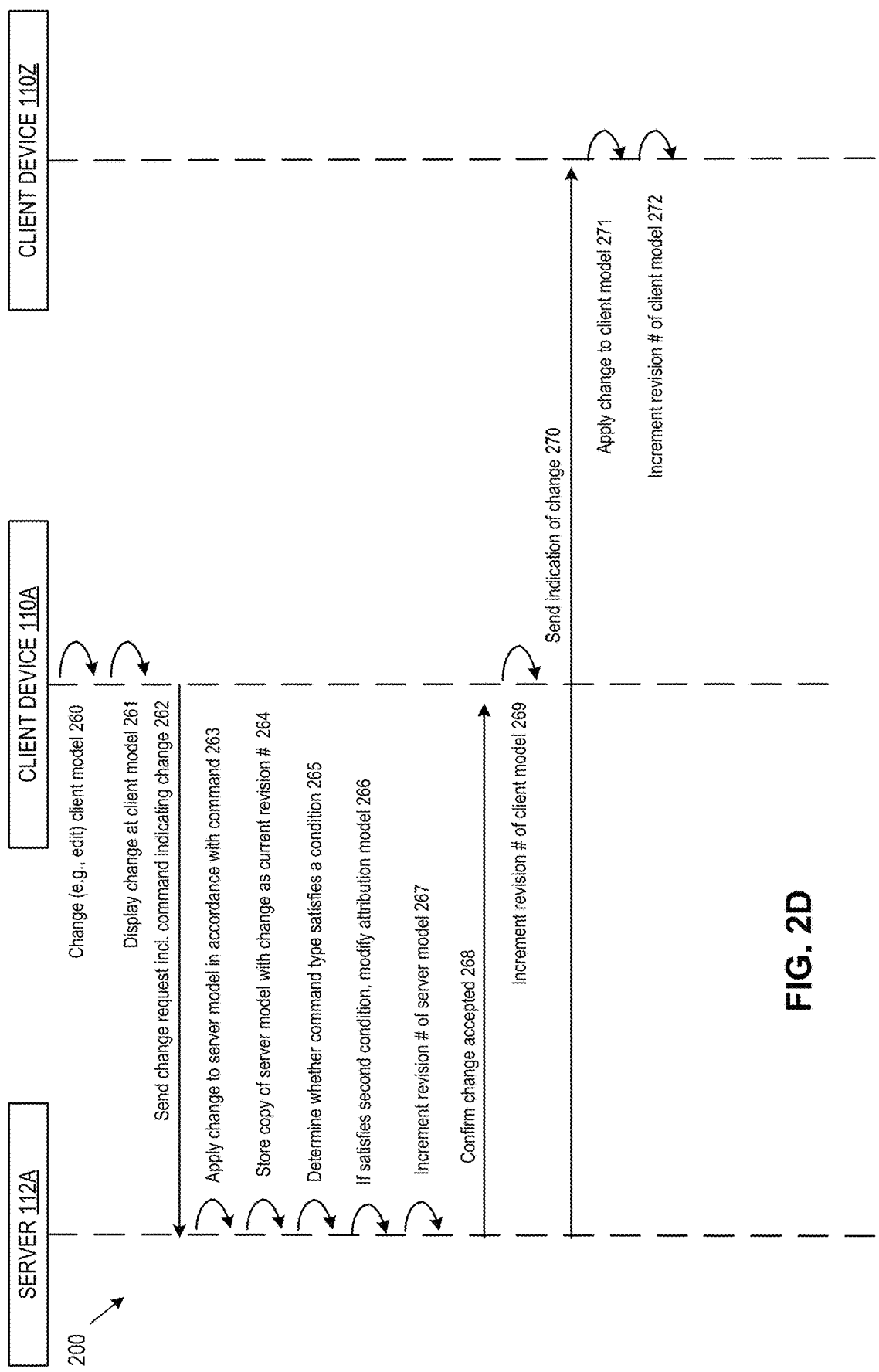
FIG. 2D is a diagram of operations for updating an attribution model, in accordance with embodiments of the disclosure.
Figure 3D:
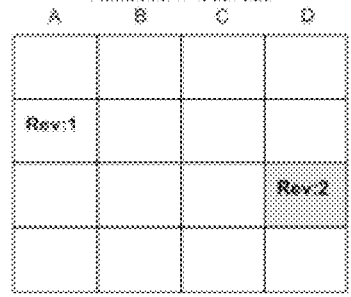
FIG. 3D is a diagram illustrating a server model and an attribution model, in accordance with embodiments of the disclosure.

FIG. 2D is a diagram of operations for updating an attribution model, in accordance with embodiments of the disclosure. System 200 may include similar components as system architecture 100 of FIG. 1. It may be noted that components of FIG. 1 may be used to help describe FIG. 2B. For purposes of illustration, rather than limitation, operations with respect to system 200 are described as performed by attribution module 118A of server 112A, attribution module 118B of client device 110A, attribution module 118Z of client device 110Z, or may be performed by any component thereof, unless otherwise described. The operations described with respect to FIG. 2D are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 3D is a diagram illustrating a server model and an attribution model, in accordance with embodiments of the disclosure. Components of FIG. 3D are used to help describe the operations described with respect to FIG. 2D. In embodiments, the operations of FIG. 2D are similar to the operations described with respect to FIG. 2A, and the description with respect to FIG. 2A can be used to provide additional details to the operations described with respect to FIG. 2D.

At operation 260, client device 110A makes a change to the client model of the collaborative electronic document. As illustrated in FIG. 3D, a user of client device 110A adds a column between original column C and column D of collaborative spreadsheet document.

At operation 261, the client device 110A displays the updated client model of the collaborative electronic document that includes the change. For example, client device 110A, in the GUI, displays an updated client model of the collaborative spreadsheet document that includes the new column D. The other columns and associated cells to the right of new column D have been adjusted accordingly.

At operation 262, client device 110A sends a change request to server 112A. The change request can include a command that indicates a change to the coordinate structure of the client model of the collaborative electronic document at client device 110A. For example, server 112A can receive the change request that includes a command that indicates a change to the dimensions of the coordinate structure of the client model of the collaborative spreadsheet document stored at client device 110A.

In the current example, server 112A can receive the change request that includes a command (e.g., "add column") of a second command type that indicates a change to the coordinate structure of the client model of the collaborative spreadsheet document stored at client device 110A. The change request identifies the coordinate locations, column C and column D, of the client model of the collaborative spreadsheet document between which the new column is added. The change request also identifies the number of columns added, a current revision number (e.g., rev. 4) of the client model, and a session identifier.

At operation 263, server 112A applies the change to the coordinate structure of a server model of the collaborative electronic document in accordance with the command. For example, in FIG. 3D the user inserts a new column between original column C and column D of the client model of the collaborative spreadsheet document. To apply the change to the coordinate structure of the server model 310 of the collaborative spreadsheet document, the new column D is added to the server model 310 of the collaborative spreadsheet document, and the columns to the right of column D are shifted right and are associated with new coordinate identifiers. The current revision number is revision 4, and the revision identifier can be rev. 4.

At operation 264, server 112A stores a revision copy of the server model of the collaborative electronic document with the applied change to the coordinate structure of the server model of the collaborative electronic document. The revision copy is associated with the current revision identifier. For example, server 112A stores a revision copy of the current state of the server model of the collaborative spreadsheet document with a new inserted column. The server associates the revision copy with the current revision identifier, rev. 4.

At operation 265, server 112A determines whether the command type of the command satisfies a command type condition (e.g., is one of predefined command types). In the current embodiment, server 112A determines that the command type of the command is a second command type that changes the coordinate structure of the collaborative electronic document. For example, the command, "add column," is of a second command type that changes the dimensions of the coordinate structure of collaborative spreadsheet document.

At operation 266, responsive to determining that that command type of the command satisfies a command type condition (e.g., is of the second command type), server 112A modifies the coordinate structure of the attribution model to reflect the change to the coordinate structure of the server model of the collaborative electronic document. The location of the content of the attribution model is adjusted in view of the modified coordinate structure of the attribution model For example, in FIG. 3D, the coordinate structure of the attribution model 320 is modified by adding new column D and adjusting the coordinate identifiers of the cells to the right of new column D. It is noted that the coordinate structure of the attribution model 320 is smaller than the coordinate structure of server model 310. It can also be noted that the contents of the cells of the attribution model 320 are not updated. It can also be noted that attribution information is not generated for the particular command type. It can be noted that the contents of the coordinate location of the attribution model are not updated. In other embodiments, attribution information for the second command type is generated and stored in a similar manner as described herein. It can be further noted that different applications can have different command types for which attribution information is generated, stored, and later retrieved in response to an attribution query.

At operation 267, server 112A can update the current revision number of the server model of the collaborative electronic document. For example, server 112A can increment the revision number of the server model from revision 4 (rev. 4) to revision 5 (rev. 5).

At operation 268, server 112A can send an indication to client device 110A that the change submitted in the change request has been applied to the server model of the collaborative electronic document.

At operation 269, responsive to receiving the indication that the change submitted in the change request has been applied to the server model of the collaborative electronic document, client device 110A updates the current revision number of the client model of the collaborative electronic document. For example, client device 110A can increment the revision number of the client model from revision 4 (rev. 4) to revision 5 (rev. 5). After updating the current revision number, the client model of the collaborative electronic document at client device 110A is synchronized with the server model of the collaborative electronic document.

At operation 270, server 112A sends an indication of the change to the server model to client device 110Z. For example, the indication of the change can indicate a column was added between original column C and column D of the collaborative electronic document.

At operation 271, responsive to receiving the indication of the change to the server model, client device 110Z applies the change to the client model of the collaborative electronic document at client device 110Z. For example, client device 110Z inserts a new column D between original column C and original column D, and shifts the columns and values to the right of column D.

At operation 272, client device 110Z updates the current revision number of the client model of the collaborative electronic document. For example, client device 110Z can increment the revision number of the client model from revision 4 (rev. 4) to revision 5 (rev. 5). After updating the current revision number, the client model of the collaborative electronic document at client device 110Z is synchronized with the server model of the collaborative electronic document.

Figure 4:
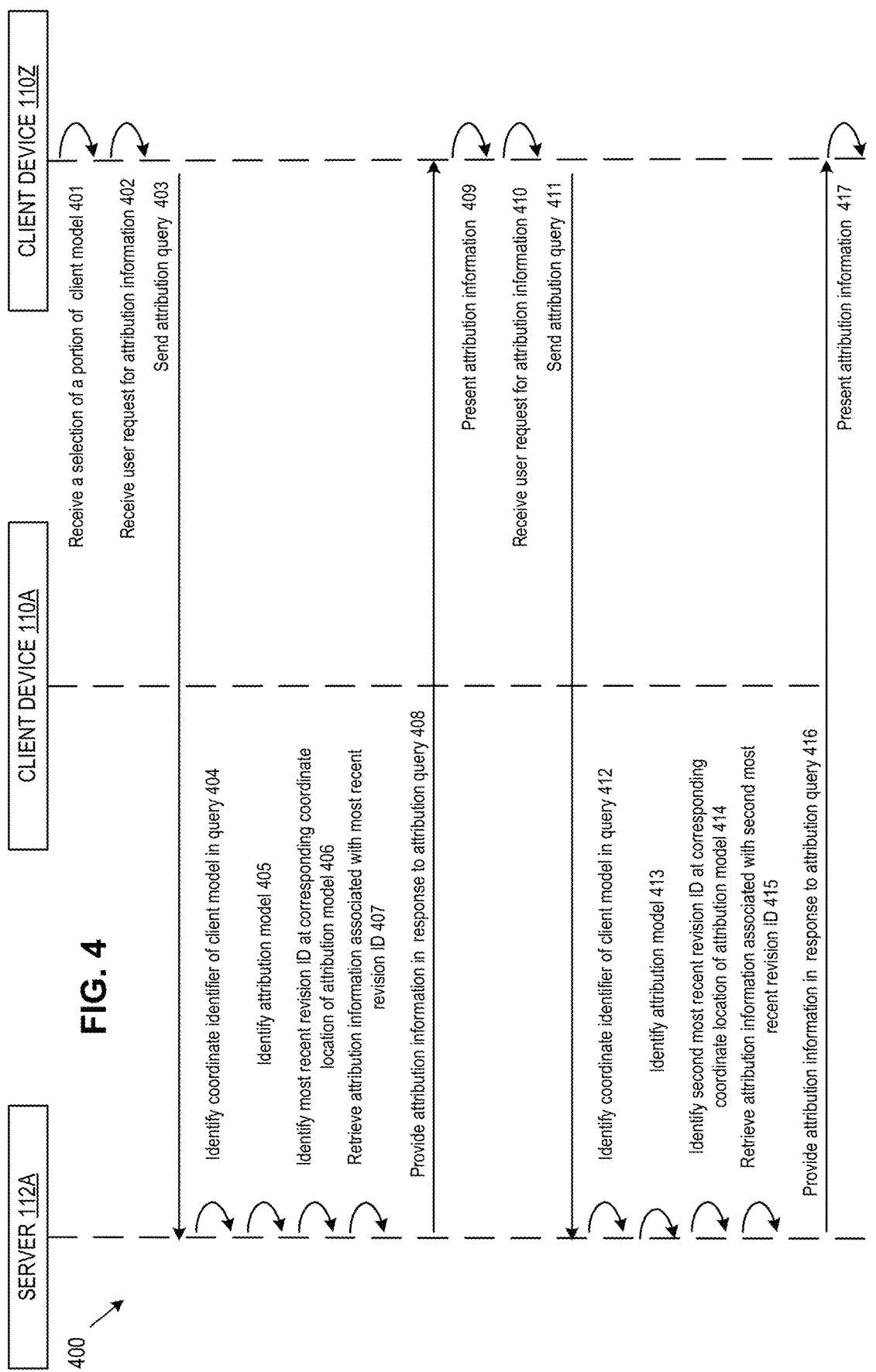
FIG. 4 is a diagram of operations for providing the attribution information to a client device, in accordance with embodiments of the disclosure.
Figure 5:
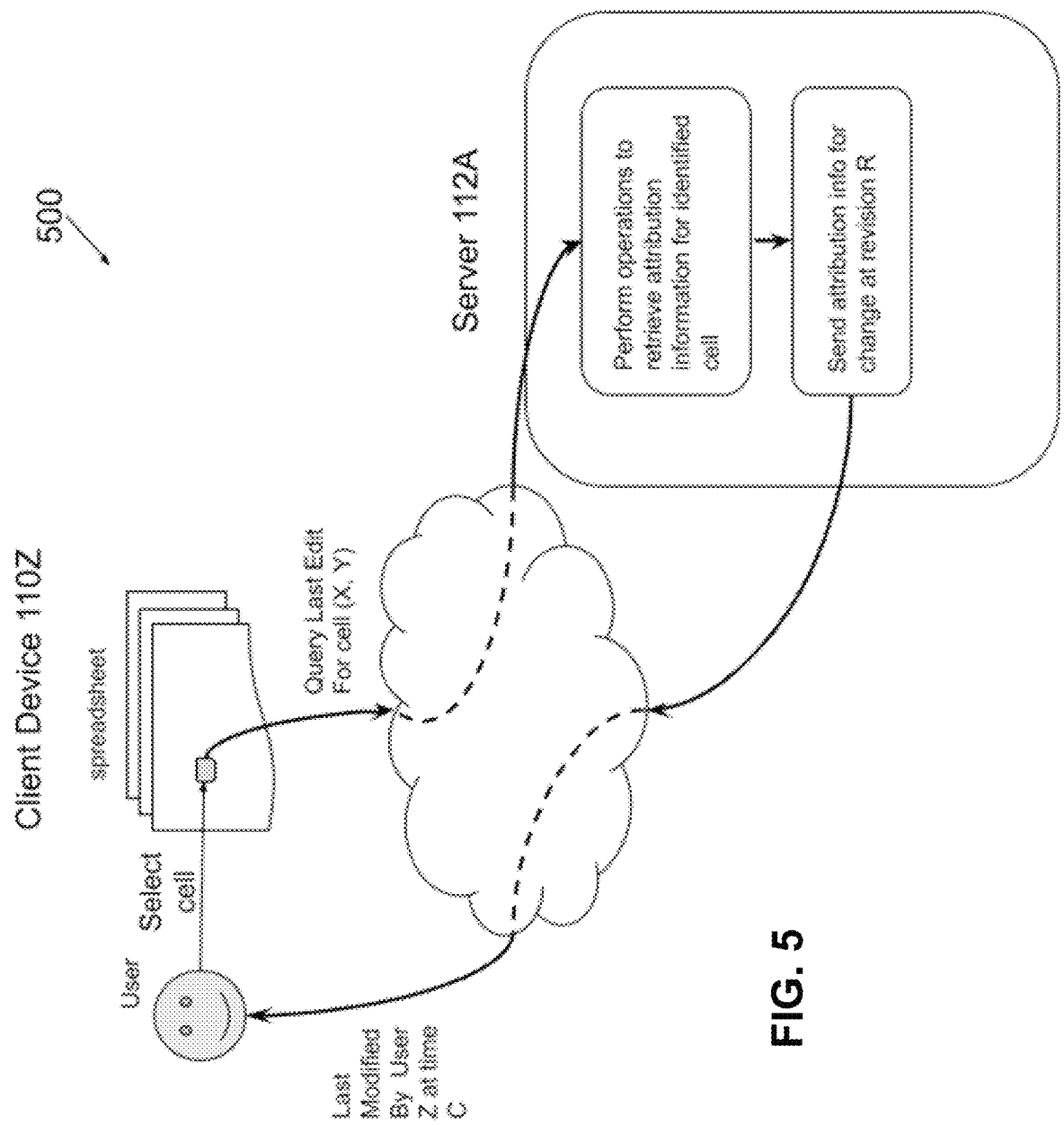
FIG. 5 is a diagram illustrating a system to provide the attribution information to a client device, in accordance with embodiments of the disclosure.

FIG. 4 is a diagram of operations for providing the attribution information to a client device, in accordance with embodiments of the disclosure. System 400 may include similar components as system architecture 100 of FIG. 1. It may be noted that components of FIG. 1 and FIG. 3D may be used to help describe FIG. 4. For purposes of illustration, rather than limitation, operations with respect to system 400 are described as performed by attribution module 118A of server 112A, attribution module 118B of client device 110A, attribution module 118Z of client device 110Z, or may be performed by any component thereof, unless otherwise described. The operations described with respect to FIG. 4 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 5 is a diagram illustrating a system 500 to identify and provide the attribution information to a client device, in accordance with embodiments of the disclosure. Components of FIG. 5 are used to help describe the operations described with respect to FIG. 4.

At operation 401, client device 110Z receives, via a graphical user interface (GUI) presented at client device 110Z, a selection by a user identifying a portion of a client model of a collaborative electronic document. For example, in FIG. 5 the user selects a particular cell of the collaborative spreadsheet document.

At operation 402, client device 110Z receives a user request for attribution information for a change of content within the portion of the client model selected by the user. For example, the user can right-click while the cell of the collaborative spreadsheet document is selected, or perform another similar action. A graphical user interface element (e.g., a pull-down menu, a list of checkboxes or radio buttons, etc.) can be displayed that allows the user to request the attribution information for the selected cell.

At operation 403, client device 110Z sends an attribution query to the server 112A of the cloud-based document editing system requesting the attribution information associated with the selected portion of the collaborative electronic document. In embodiments, the attribution query includes a coordinate identifier that identifies the portion of the client model of the collaborative electronic document. For example in FIG. 5 the query includes the coordinate identifier (e.g., x-coordinate and y-coordinate) of the selected cell.

At operation 404, server 112A identifies the coordinate location of the client model of the collaborative electronic document from the attribution query. For example, server 112A identifies the x-coordinate and y-coordinate of the selected cell from the attribution query. For example, the coordinate location of the cell identified in the attribution is cell located at A2.

At operation 405, server 112A identifies the attribution model that is associated with the collaborative electronic document. For example, in FIG. 3D, server 112A identifies attribution model 320 as being associated with the particular collaborative electronic document.

At operation 406, server 112A identifies the revision identifier associated with the corresponding coordinate location of the attribution model using the coordinate identifier of the client model from the attribution query. In some embodiments, the coordinate location of the attribution model can include multiple revision identifiers. The selected or identified revision identifier can depend on what is being requested by the attribution query. If the attribution query requests the attribution information of the last edit (e.g., most recent edit), server 112A can identify the revision identifier at the particular coordinate location with the largest number. If the attribution query requests the attribution information of the second to last edit, server 112A can identify the revision identified at the particular coordinate location with the second largest number.

In the current example, in FIG. 5 the attribution query requests the attribution information for the last edit of cell A2. As illustrated in FIG. 3D, server 112A identifies revision identifier, rev. 3.

At operation 407, server 112A retrieves the attribution information that is associated with the revision identifier. For example, server 112A uses the revision identifier, rev. 3, to locate the corresponding attribution information that is stored at the data store. The attribution information can indicate that user Z of client device 110Z made the last change to cell A2 at 7:40 PM Mar. 27, 2019.

At operation 408, server 112A provides the attribution information to the client device in response to the attribution query.

At operation 409, client device 110Z presents the attribution information to the user of client device 110Z. In some embodiments, client device 110Z provides a graphical user interface element in the GUI to present the attribution information. The attribution information can include a user identifier of a user that changed the content of the portion of the client model of the collaborative electronic document.

At operation 410, client device 110Z receives a subsequent user request for additional attribution information for another change (e.g., second most recent change) of content within the portion of the client model selected by the user. For example, the graphical user interface element that was previously displayed can allow the user to retrieve the additional attribution information for the selected cell.

At operation 411, client device 110Z sends an attribution query to the server 112A of the cloud-based document editing system requesting the additional attribution information associated with the coordinate location of the selected portion of the collaborative electronic document. In embodiments, the attribution query includes a coordinate identifier that identifies the portion of the client model of the collaborative electronic document. For example in FIG. 5 the query includes the coordinate identifier (e.g., x-coordinate and y-coordinate) of the selected cell.

At operation 412, server 112A identifies the coordinate identifier of the client model of the collaborative electronic document from the attribution query. For example, server 112A identifies the x-coordinate and y-coordinate (A2) of the selected cell from the attribution query.

At operation 413, server 112A identifies the attribution model that is associated with the collaborative electronic document. For example, in FIG. 3D, server 112A identifies attribution model 320 as being associated with the particular collaborative electronic document.

At operation 414, server 112A identifies the revision identifier associated with the corresponding coordinate location of the attribution model using the coordinate identifier of the client model obtained from the attribution query. In embodiments, the attribution query requests the attribution information of the second to last edit. Server 112A can identify the revision identified at the particular coordinate location with the second largest number. In the current example, in FIG. 3D, server 112A identifies revision identifier, rev. 1.

At operation 415, server 112A retrieves the attribution information that is associated with the revision identifier. For example, server 112A uses the revision identifier, rev. 1, to locate the corresponding attribution information that is stored at the data store. The attribution information can indicate that user Z of client device 110Z made the last change to cell A2 at 1:20 PM Mar. 26, 2019.

At operation 416, server 112A provides the attribution information to the client device in response to the attribution query.

At operation 417, client device 110Z presents the attribution information to the user of client device 110Z. In some embodiments, client device 110Z presents, via a graphical user interface element in the GUI, the additional attribution information. The additional attribution information includes a user identifier of a user that changed (e.g., second most recent change) the content of the portion of the client model of the collaborative electronic document.

It can be noted that in embodiments, the attribution information can be provided to the client device 110Z irrespective of whether or not any of the users of the collaborative electronic document invoked a track-changes command (e.g., a command that tracks changes to a document).

Figure 6A:
FIG. 6A-6C are diagrams illustrating a server model and an attribution model used to provide previous content of collaborative electronic document to a client device, in accordance with embodiments of the disclosure.
Figure 6B:
Figure 6C:

FIG. 6A-6C are diagrams illustrating a server model and an attribution model used to provide previous content of a collaborative electronic document to a client device, in accordance with embodiments of the disclosure. Operations described with respect to FIG. 6A-6C are similar to the operations described with respect to FIG. 2A-2D and FIG. 3A-3D. For the sake of clarity, many of the operations and components described with respect to FIG. 2A-2D and FIG. 3A-3D are not repeated here. The operations and components described with respect FIG. 2A-2D and FIG. 3A-3D can be applied to the diagrams of FIG. 6A-6C, unless otherwise described. The diagrams of FIG. 6A-6C show how data associated with coordinate location of the attribution model 620 can updated to allow for previous content (e.g., values) to be retrieved and provided to a client device as part of the attribution information.

FIG. 6A corresponds to the FIG. 2B. In FIG. 6A, the user of client device 110A types the content, "ipsum," into the client model of the collaborative spreadsheet document. In some embodiments, the client device 110A can send a change request to server 112A that include a command of a first command type. The command can indicate that the content, "ipsum," has been added to the cell at D3 of the client model of the collaborative spreadsheet document. The current revision of the collaborative spreadsheet document is revision 2 (e.g., rev. 2). The server 112A can apply the corresponding change to the server model 610 of the collaborative spreadsheet document. The server 112A can store a revision copy of the server model and associate the revision copy with the current revision identifier, rev. 2. The server 112A can determine that the command satisfies a command condition (e.g., that the command type of the command is of the first command type). Responsive to determining that the command type of the command is a first command type, server 112A can update the corresponding coordinate location of the attribution model 620.

In some embodiments, to update the corresponding coordinate location of the attribution model 620, the server updates the corresponding coordinate location with the current revision identifier (e.g., rev. 2) and a coordinate identifier (e.g., D2) of the coordinate location at which the change is applied at the server model 610 of the collaborative spreadsheet document. In some embodiments, to update the corresponding coordinate location of the attribution model 620, the server updates the corresponding coordinate location with the current revision identifier (e.g., rev 2) and the corresponding coordinate identifier (e.g., D2) of the coordinate location (of the attribution model) that is being updated (which is the same as the coordinate identifier (e.g., D2) at which the change is applied at the server model 610 of the collaborative spreadsheet document).

In some embodiments, server 112A generates attribution information corresponding to the current revision. For example, the attribution information can be user A at time A. The attribution information is stored in association with the current revision identifier.

In some embodiments, the current revision number used at the attribution model 620 is identified as the current revision number. For example, in attribution model 620 the current revision number is identified by "R:2." In some embodiments, the coordinate identifier used at the attribution model 620 is identified as the current coordinate location. For example, in the attribution model 620 the current coordinate location is identified by "C:D2."

The server 112A can update the revision number of the server model of the collaborative spreadsheet document from current revision number 2 (rev. 2) to revision number 3 (rev. 3).

FIG. 6B corresponds to the FIG. 2D. In FIG. 6B, the user of client device 110Z makes a change to the coordinate structure of the client model of the collaborative spreadsheet document. For example, the user of client device 110Z deletes column B of the client model of the collaborative spreadsheet document (rather than add a column as in FIG. 2D). Client device 110Z sends a change request to server 112A that includes a command of a second command type to change the coordinate structure of the collaborative spreadsheet document. Server 112A receives the command and applies the change to server model 610 of the collaborative spreadsheet document. For example, column B of the server model 610 is removed and the cells to the right of column B are shifted left and the coordinate identifiers of the coordinate location of the shifted cells are accordingly modified. The server 112A determines the command type of the command satisfies the condition of being of a second command type, and takes appropriate action to modify the attribution model 620. For example, the coordinate structure of the attribution model 620 is modified to reflect the change in the coordinate structure of the server model 610 of the collaborative spreadsheet document. The column B of the attribution model 620 is removed and the cells to the right of column B (and their contents) are shifted left and the coordinate identifiers of the shifted cells are accordingly modified. It can be noted that the contents of the coordinate locations for both the server model 610 and attribution model 620 are not changed. The server 112A can store a revision copy of the server model and associate the revision copy with the current revision identifier, rev. 3. The server 112A can update the revision number of the server model of the collaborative spreadsheet document from current revision number 3 (rev. 3) to revision number 4 (rev. 4).

FIG. 6C corresponds to the FIG. 2C. In FIG. 6C the user of client device 110Z types the content, "Lorem," into cell C2 of the client model of the collaborative spreadsheet document, which replaces the previous content, "ipsum." In some embodiments, the client device 110Z can send a change request to server 112A that include a command of a first command type. The command can indicate that the content, "Lorem," has replaced the previous content of the cell at C2 of the client model of the collaborative spreadsheet document. The current revision of the collaborative spreadsheet document is revision 4 (e.g., rev. 4). The server 112A can apply the corresponding change to the server model 610 of the collaborative spreadsheet document. The server 112A can store a revision copy of the server model and associate the revision copy with the current revision identifier, rev. 4. The server 112A can determine that the command satisfies a command condition (e.g., that the command type of the command is of the first command type). Responsive to determining that the command type of the command is a first command type, server 112A can update the corresponding coordinate location of the attribution model 620.

In some embodiments, to update the corresponding coordinate location of the attribution model 620, server updates the corresponding coordinate location with the current revision identifier (e.g., rev. 4) and a coordinate identifier (e.g., C2) of the coordinate location at which the change is applied at the server model 610 of the collaborative spreadsheet document. In some embodiments, to update the corresponding coordinate location of the attribution model 620, server updates the corresponding coordinate location with the current revision identifier (e.g., rev 4) and the corresponding coordinate identifier (e.g., C2) of the coordinate location of the attribution model that is being updated.

In some embodiments, server 112A generates attribution information corresponding to the current revision. For example, the attribution information can be user Z at time Z. The attribution information is stored in association with the current revision identifier.

In some embodiments, the current revision number associated with the coordinate location of the attribution model 620 is identified as the current revision number. For example, in attribution model 620 the current revision number is identified by "R:4." In embodiments, the previous revision number used at the attribution model 620 is kept and is identified as the previous revision number. For example, in attribution model 620 the previous revision number is identified as "PR:2." In some embodiments, the coordinate identifier used at the attribution model 620 is used to identify the current coordinate location. For example, in the attribution model 620 the current coordinate location is identified by "C:C2." In embodiments, the previous coordinate identifier used in the coordinate location of the attribution model 620 is used to identify the previous coordinate location. For example, in the attribution model 620 the previous coordinate location is identified by "PC: D2." In some embodiments, one or more revision copies of the attribution model can be stored in a similar manner as described with respect to revision copies of the server model of the collaborative electronic document. In some embodiments, to go further back in the attribution history, older revisions of the attribution model can be loaded to determine the attribution information. In some embodiments, any number of previous revision numbers or previous coordinate identifiers can be stored at a coordinate location of attribution model 620.

Figure 7:
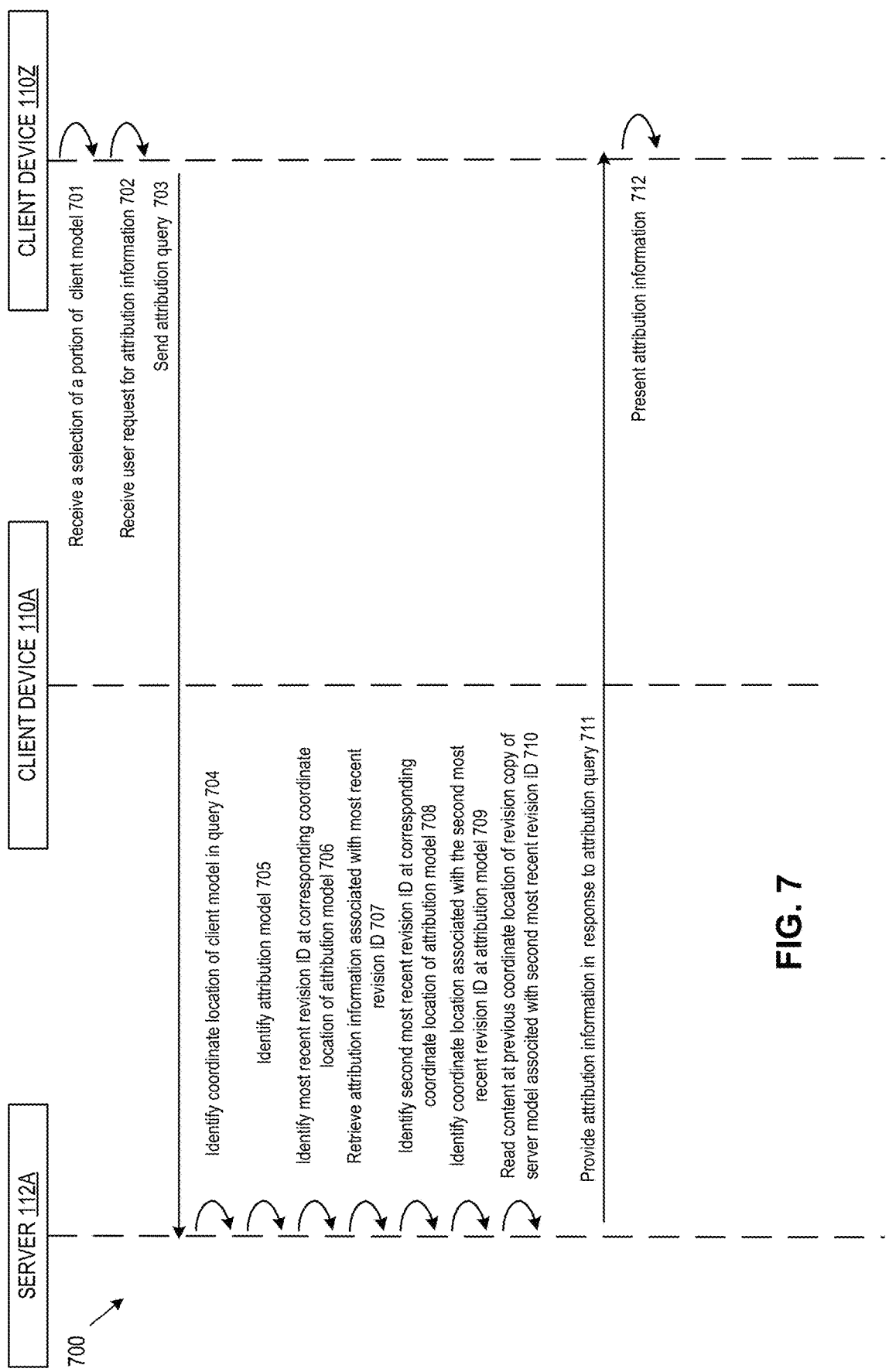
FIG. 7 is a diagram of operations for providing the attribution information including previous content of a portion of the collaborative electronic document to a client device, in accordance with embodiments of the disclosure.
Figure 8A:
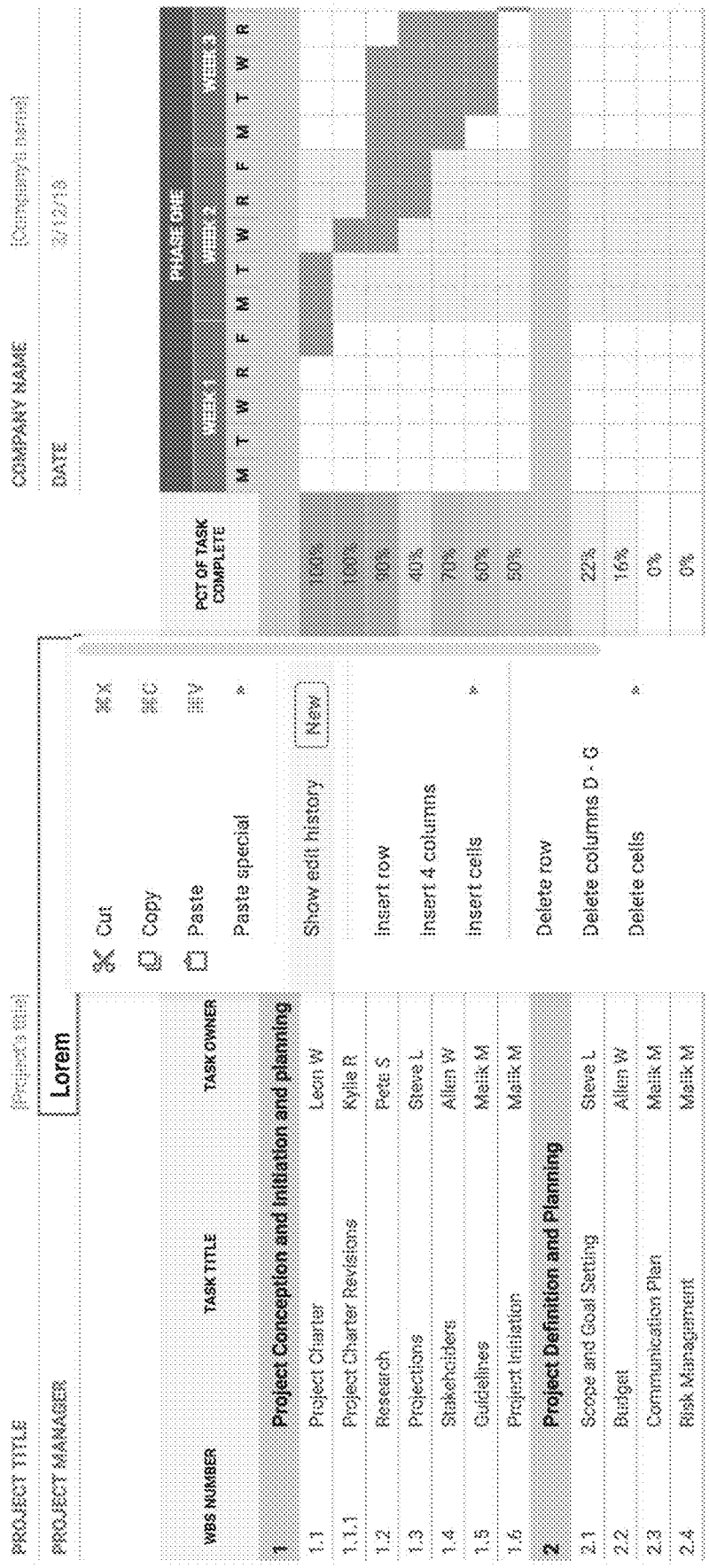
FIG. 8A-8B illustrate a graphical user interface that allows a user to retrieve attribution information, in accordance with embodiments of the disclosure.
Figure 8B:
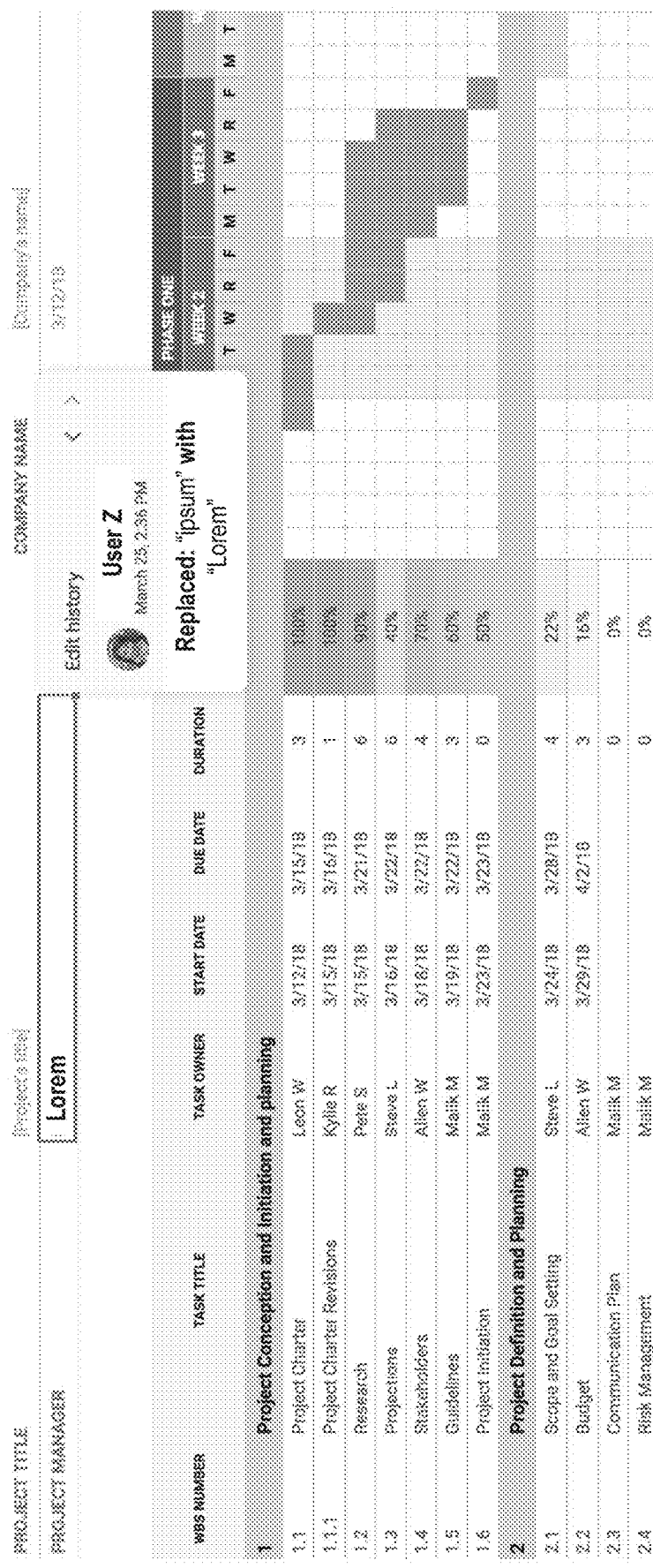

FIG. 7 is a diagram of operations for providing the attribution information including previous content of a portion of the collaborative electronic document for presentation at a client device, in accordance with embodiments of the disclosure. System 700 may include similar components as system architecture 100 of FIG. 1. It may be noted that components of FIG. 1 and FIG. 6A-6C and FIG. 8A-8B may be used to help describe FIG. 7. For purposes of illustration, rather than limitation, operations with respect to system 700 are described as performed by attribution module 118A of server 112A, attribution module 118B of client device 110A, attribution module 118Z of client device 110Z, or may be performed by any component thereof, unless otherwise described. The operations described with respect to FIG. 7 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. FIG. 8A-8B illustrate a graphical user interface that allows a user to retrieve attribution information, in accordance with embodiments of the disclosure. It can be noted that the GUI described with respect to FIG. 8A-8B can be used with any aspects of the disclosure in addition to the operation described with respect to FIG. 7.

At operation 701, client device 110Z receives, via a graphical user interface (GUI) presented at client device 110Z, a selection by a user identifying a portion of a client model of a collaborative electronic document. For example, in FIG. 8A the user selects a particular cell of the collaborative spreadsheet document. The cell contains the content "Lorem."

At operation 702, client device 110Z receives a user request for attribution information for a most recent change of content within the portion of the client model selected by the user. For example, in FIG. 8A the user can right-click while the cell of the collaborative spreadsheet document is selected. A graphical user interface element can be displayed that provides one or more command options available to the user with respect to the selected cell. As illustrated, on option "Show edit history" allows the user to retrieve the history of attribution information for the selected cell. The user can select the "Show edit history" command option to retrieve the attribution information associated with the selected cell(s).

At operation 703, client device 110Z sends an attribution query to the server 112A of the cloud-based document editing system requesting the attribution information associated with the selected portion of the collaborative electronic document. In embodiments, the attribution query includes a coordinate identifier that identifies the portion of the client model of the collaborative electronic document. For example in FIG. 8A the query includes the coordinate identifier (e.g., x-coordinate and y-coordinate) of the selected cell. For instance, the coordinate identifier is C2.

At operation 704, server 112A identifies the coordinate location of the client model of the collaborative electronic document from the attribution query. For example, server 112A identifies the x-coordinate and y-coordinate of the selected cells from the attribution query.

At operation 705, server 112A identifies the attribution model that is associated with the collaborative electronic document. For example, in FIG. 6C, server 112A identifies attribution model 620 as being associated with the particular collaborative electronic document.

At operation 706, server 112A identifies the most recent revision identifier associated with the corresponding coordinate location of the attribution model using the coordinate identifier of the coordinate location of the client model identified from the attribution query. In the current example, in FIG. 6C the attribution query requests the attribution information for the last edit of cell C2. As illustrated in FIG. 6C, server 112A identifies revision identifier, rev. 4 (e.g., "R:4") as the revision identifier associated with the last edit.

At operation 707, server 112A retrieves the attribution information that is associated with the revision identifier. For example, server 112A uses the revision identifier, rev. 4, to locate the corresponding attribution information that is stored at the data store. The attribution information can indicate that user Z of client device 110Z made the last change to the cell at C2 at 2:36 PM Mar. 25, 2019.

At operation 708, server identifies the second most recent revision identifier at the corresponding coordinate location of the attribution model. For example, in FIG. 6C, server 112A reads the cell at C2 of the attribution model 620 and identifies the previous revision number, rev. 2 (e.g., "PR:2").

At operation 709, server 112A identifies the coordinate identifier associated with the second most recent revision identifier at the attribution model. For example, in FIG. 6C, server reads the cell at C2 of attribution model 630 and identifies the coordinate identifier previous coordinate location, the cell at D2 (e.g., "PC:D2"), that is associated with the previous revision number, rev. 2 (e.g., "PR:2").

At operation 710, server 112A reads the content of the previous coordinate location at the revision copy of the server model of the collaborative electronic document that is associated with the previous revision number. For example, server 112A can locate the revision copy of the server model of the collaborative spreadsheet document that is associated with the previous revision number, rev. 2 (e.g., "PR:2"). Server 112A can read the content of the previous coordinate location, the cell at D2, of the revision copy. In the current example, the contents of the cell at D2 of the revision copy associated with rev. 2 is "ipsum," as illustrated in FIG. 6A.

At operation 711, server 112A provides the attribution information to the client device in response to the attribution query. In some embodiments, the attribution information includes the author that made the change, the timestamp of the change, and the current content of the portion of the collaborative electronic document selected by the user, and the previous content of the portion of the collaborative electronic document selected by the user.

At operation 712, client device 110Z presents the attribution information to the user of client device 110Z. In some embodiments, client device 110Z provides a graphical user interface element in the GUI to present the attribution information. For example, in FIG. 8B, the graphical user interface element in the GUI shows that "User Z" made the last edit on March 25 at 2:36 PM and the edit replaced the previous content "ipsum" with the current content "Lorem." It can be noted that the graphical user interface element includes right and left arrows that allow the user to look at the history of attribution information for the selected portion of the collaborative spreadsheet document. For example, the user can select the left arrow to determine the attribution information for the second to last edit (e.g., second most recent edit), and so forth. Operation described with respect to FIG. 7 can be repeated to allow the user to receive the history of attribution information.

Figure 9:
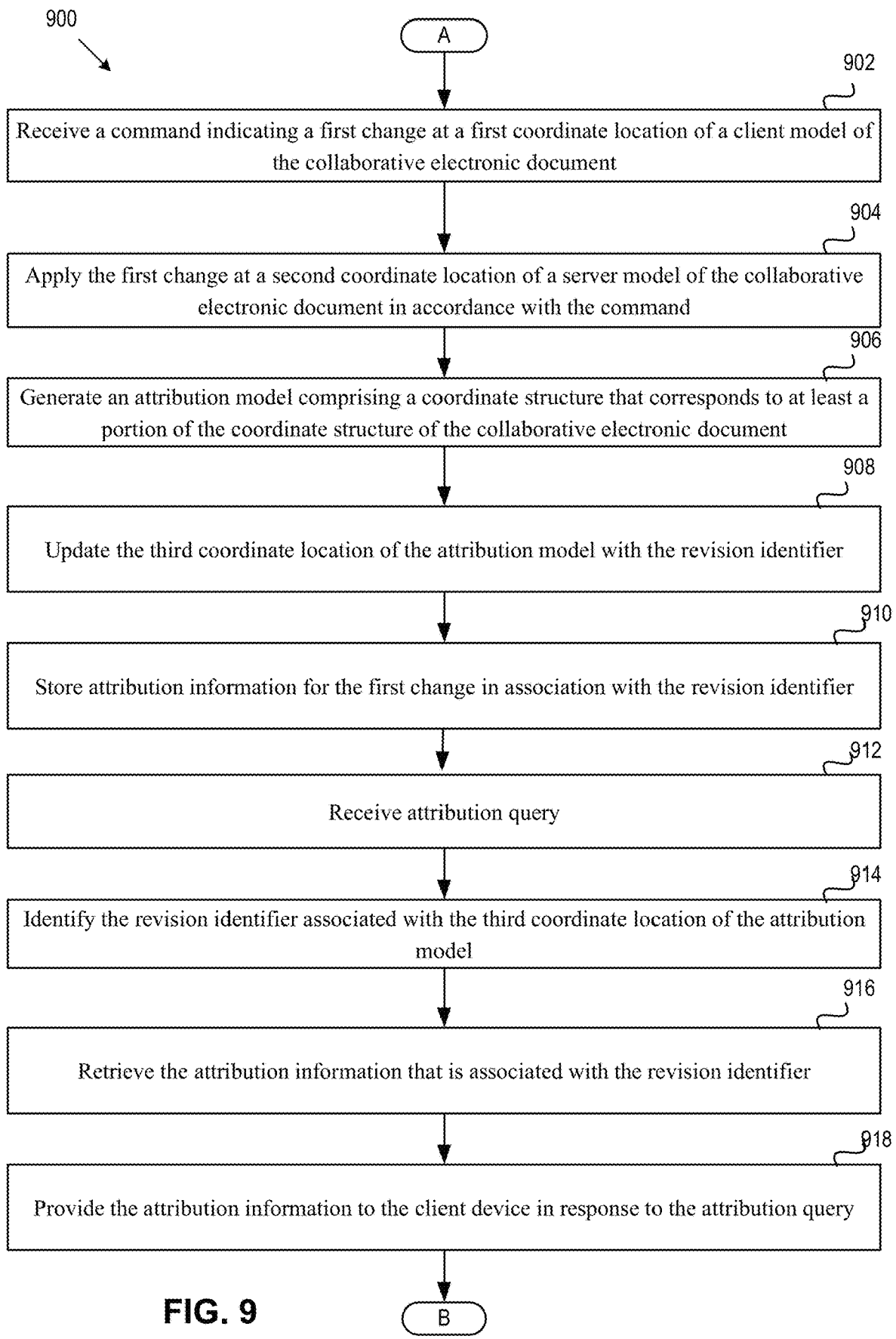
FIG. 9 is a flow diagram illustrating method for generating an attribution model to track attribution information of content in a collaborative electronic document and to provide the attribution information to a client device, in accordance with embodiments of the disclosure

FIG. 9 is a flow diagram illustrating method 900 for generating an attribution model to track attribution information of content in a collaborative electronic document and to provide the attribution information to a client device, in accordance with embodiments of the disclosure. Method 900 may be performed by processing logic that includes hardware (e.g., circuitry, dedicated logic, programmable logic, microcode), software (e.g., instructions run on a processing device to perform hardware simulation), or a combination thereof. In some embodiments, attribution module 118 executing at client device 110 may perform some or all the operations. In other embodiments, attribution module 118 executing at server(s) 112 may perform some or all the operations. In some embodiments, attribution module 118 executing at client device 110 and server(s) 112 may perform some or all the operations. It may be noted that the in some embodiments, method 900 may include the same, different, fewer, or a greater number of operations performed in any order.

At block 902, processing logic executing method 900 receives an indication (e.g., as part of a command) of a first change at a first coordinate location of a client model of the collaborative electronic document. The first coordinate location is within a coordinate structure of the collaborative electronic document. At block 904, processing logic applies the first change at a second coordinate location of a server model of the collaborative electronic document. The second coordinate location of the server model corresponds to the first coordinate location of the client model. The first change is associated with a revision identifier.

In some embodiments, processing logic stores a revision copy of the server model of the collaborative electronic document with the first change at the second coordinate location. The revision copy is associated with the revision identifier.

In some embodiments, processing logic determines whether a command type of the command satisfies a command type condition. The attribution model is generated responsive to determining that the command type of the command satisfies the command type condition.

At block 906, processing logic generates an attribution model that includes a coordinate structure that corresponds to at least a portion of the coordinate structure of the collaborative electronic document. The attribution model includes a third coordinate location that corresponds to the first coordinate location and the second coordinate location.

In some embodiments, to generate an attribution model that includes a coordinate structure that corresponds to at least a portion of the coordinate structure of the collaborative electronic document, processing logic generates the attribution model that has a coordinate structure that is smaller than the coordinate structure of the collaborative electronic document.

At block 908, processing logic updates the third coordinate location of the attribution model with the revision identifier.

At block 910, processing logic stores attribution information for the first change in association with the revision identifier. In some embodiments, the attribution information includes an indication of a user associated the first change and a timestamp associated with the first change.

In some embodiments, processing logic receives a command indicating a change to a coordinate structure of the collaborative electronic document. Processing logic applies the change to the coordinate structure of the server model of collaborative electronic document. The change to the coordinate structure of the collaborative electronic document is associated with a second revision identifier. Processing logic modifies the coordinate structure of the attribution model to reflect the change to the coordinate structure of the collaborative electronic document. The location of content of the attribution model is adjusted in view of the modified coordinate structure of the attribution model.

In some embodiments, processing logic stores a revision copy of the server model of the collaborative electronic document with the change to the coordinate structure of the collaborative electronic document. The revision copy including the change to the coordinate structure is associated with the second revision identifier. Processing logic refrains from updating the third coordinate location of the attribution model with the first updated revision identifier in view of the command type being a second command type.

At block 912, processing logic receives an attribution query. The attribution query requests the attribution information associated with the first coordinate location of the client model of the collaborative electronic document.

At block 914, processing logic identifies the revision identifier associated with the third coordinate location of the attribution model. The revision identifier is identified using the first coordinate location of the client model of the collaborative electronic document.

At block 916, processing logic retrieves, from a designated data store, the attribution information that is associated with the revision identifier.

At block 918, processing logic provides the attribution information to the client device in response to the attribution query.

In some embodiments, updating the third coordinate location of the attribution model with the revision identifier further includes updating the third coordination location of the attribution model with a coordinate identifier of the third coordinate location. The content of the third coordinate location of the attribution model is moved to a fourth coordinate location of the attribution model in view of the adjusted coordinate structure of the attribution model. Processing logic receives a command indicating a second change at a fifth coordinate location of the client model of the collaborative electronic document. Processing logic applies the second change at a sixth coordinate location of the server model of the collaborative electronic document in accordance with the command. The sixth coordinate location of the server model corresponds to the fifth coordinate location of the client model. The second change is associated with a third revision identifier. Processing logic updates the fourth coordinate location of the attribution model with the third revision identifier and a coordinate identifier of the fourth coordinate location. Processing logic stores attribution information for the second change in association with the third revision identifier.

In embodiments, processing logic receives a request for the attribution information associated with the fifth coordinate location of the client model of the collaborative electronic document. Processing logic identifies the first revision identifier, the third revision identifier, and the coordinate identifier of the third coordinate location that are associated with the fourth coordinate location of the attribution model using the fifth coordinate location of the client model of the collaborative electronic document. Processing logic retrieves the attribution information that is associated with the third revision identifier. Processing logic retrieves a first revision copy of the server model of the collaborative electronic document using the first revision identifier. Processing logic identifies the first change at the second coordinate location of the server model of the collaborative electronic document using the coordinate identifier of the third coordinate location of the attribution model. Processing logic provides the attribution information to the client device in response to the request. The attribution information includes the first change.

Figure 10:
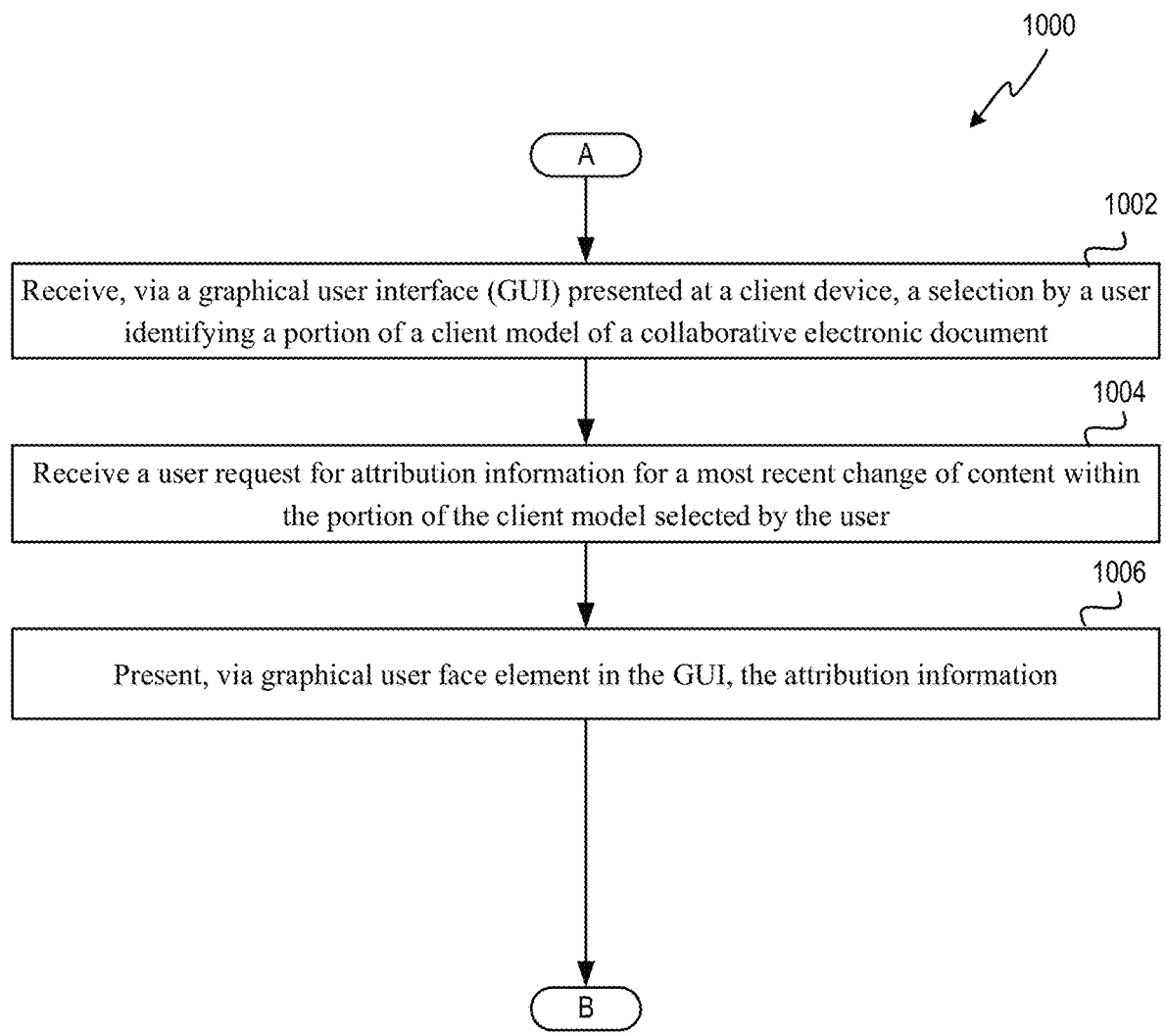
FIG. 10 is a flow diagram illustrating method for presenting attribution information at a user device, in accordance with embodiments of the disclosure.

FIG. 10 is a flow diagram illustrating method 1000 for presenting attribution information at a user device, in accordance with embodiments of the disclosure. Method 1000 may be performed by processing logic that includes hardware (e.g., circuitry, dedicated logic, programmable logic, microcode), software (e.g., instructions run on a processing device to perform hardware simulation), or a combination thereof. In some embodiments, attribution module 118 executing at client device 110 may perform some or all the operations. In other embodiments, attribution module 118 executing at server(s) 112 may perform some or all the operations. In some embodiments, attribution module 118 executing at client device 110 and server(s) 112 may perform some or all the operations. It may be noted that in some embodiments, method 1000 may include the same, different, fewer, or a greater number of operations performed in any order.

At block 1002, processing logic performing method 1000 receives, via a graphical user interface (GUI) presented at a client device, a selection by a user identifying a portion of a client model of a collaborative electronic document. The collaborative electronic document is hosted by a cloud-based document editing system. The collaborative electronic document is concurrently editable by multiple users.

At block 1004, processing logic receives a user request for attribution information for a change of content within the portion of the client model selected by the user of the multiple users.

In some embodiments, responsive to receiving the user request for the attribution information, processing logic sends an attribution query to the cloud-based document editing system requesting the attribution information. The attribution query includes a first coordinate identifier that identifies the portion of the client model of the collaborative electronic document.

At block 1006, processing logic presents, via a graphical user interface element in the GUI, the attribution information. The attribution information includes a user identifier of a user that most recently changed the content of the portion of the client model of the collaborative electronic document.

In some embodiments, the collaborative electronic document includes a collaborative spreadsheet document with a coordinate structure that includes one or more rows and one or more columns that are arranged to create multiple cells. The portion of the client model of the collaborative electronic document selected by the user includes a cell of the collaborative spreadsheet document.

In some embodiments, none of the multiple users have invoked a command to track changes applied to the portion of the collaborative electronic document.

In some embodiments, processing logic receives, via the graphical user interface, a subsequent user request for additional attribution information for another change of content within the portion of the client model selected by the user of the multiple users. Responsive to receiving the subsequent user request for the additional attribution information, processing logic presents, at the graphical user interface element in the GUI, the additional attribution information including a user identifier of a user that provided that other change to the content of the portion of the client mode of the collaborative electronic document.

Figure 11:
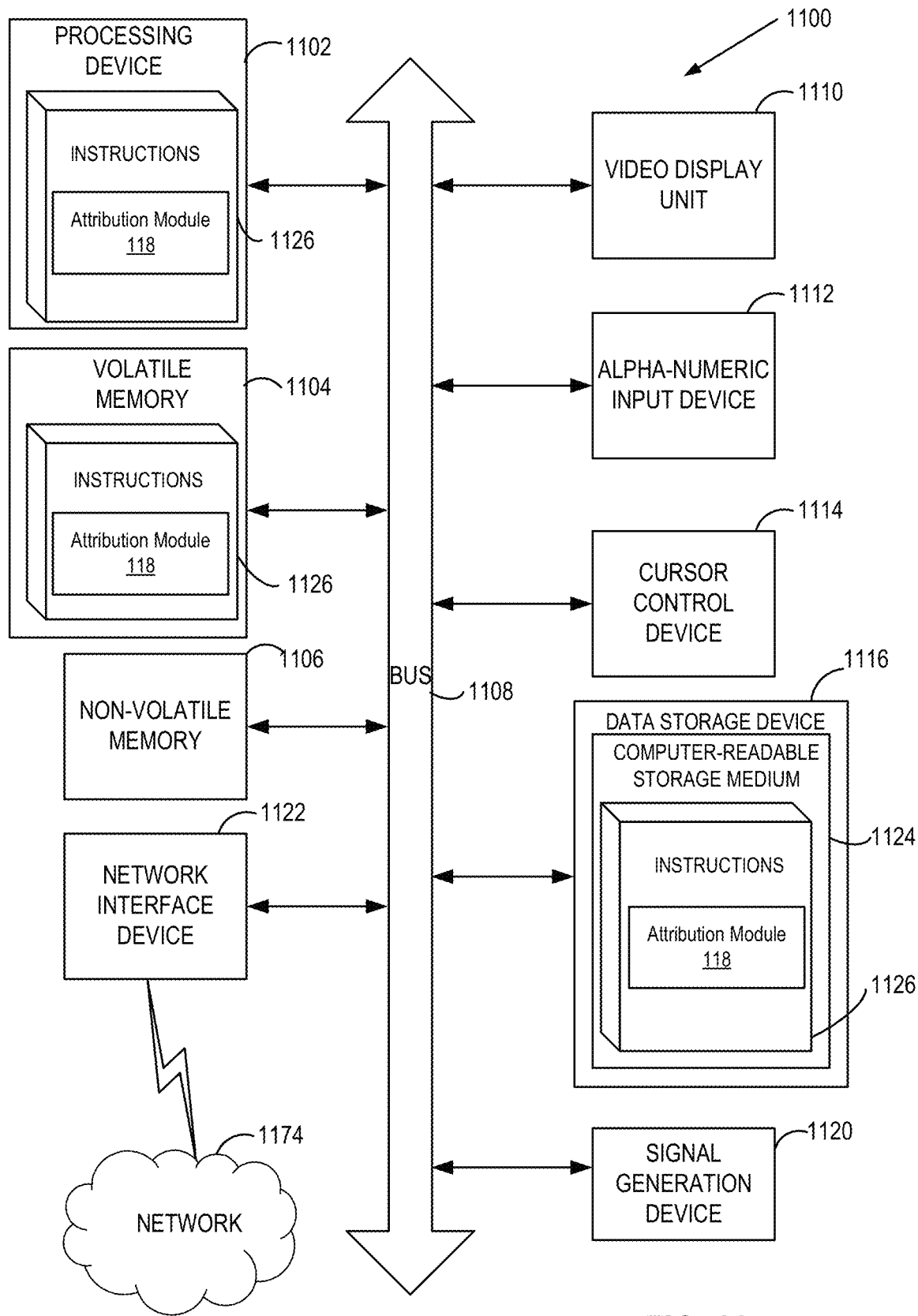
FIG. 11 depicts a block diagram of an example computing system operating in accordance with one or more aspects of the disclosure.

FIG. 11 depicts a block diagram of an example computing system operating in accordance with one or more aspects of the present disclosure. In various illustrative examples, computer system 1100 may correspond to any of the computing devices within system architecture 100 of FIG. 1. In one embodiment, the computer system 1100 may be each of the servers 112A-112Z. In another embodiment, the computer system 1100 may be each of the client devices 110A-110Z.

In certain embodiments, computer system 1100 may be connected (e.g., via a network, such as a Local Area Network (LAN), an intranet, an extranet, or the Internet) to other computer systems. Computer system 1100 may operate in the capacity of a server or a client computer in a client-server environment, or as a peer computer in a peer-to-peer or distributed network environment. Computer system 1100 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1100 may include a processing device 1102, a volatile memory 1104 (e.g., random access memory (RAM)), a non-volatile memory 1106 (e.g., read-only memory (ROM) or electrically-erasable programmable ROM (EEPROM)), and a data storage device 1116, which may communicate with each other via a bus 1108.

Processing device 1102 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1100 may further include a network interface device 1122. Computer system 1100 also may include a video display unit 1110 (e.g., an LCD), an alphanumeric input device 1112 (e.g., a keyboard), a cursor control device 1114 (e.g., a mouse), and a signal generation device 1120.

Data storage device 1116 may include a computer-readable storage medium 1124 (which may be a non-transitory computer-readable storage medium, although the disclosure is not limited to this) which may store instructions 1126 encoding any one or more of the methods or functions described herein, including instructions implementing the attribution module 118 (118A-118Z) of FIG. 1 for implementing any of the methods described herein.

Instructions 1126 may also reside, completely or partially, within volatile memory 1104 and/or within processing device 1102 during execution thereof by computer system 1100, hence, volatile memory 1104 and processing device 1102 may also constitute machine-readable storage media.

While computer-readable storage medium 1124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "applying", "generating", "updating", "storing", "receiving", "identifying", "retrieving", "providing", "determining", "modifying", "refraining", "presenting", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it can be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain embodiments of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not necessarily intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method comprising:
    receiving, from a client device, an attribution query pertaining to a selected portion of a client model of a collaborative electronic document, wherein the selected portion of the client model corresponds to a first coordinate location within a first coordinate structure of the client model of the collaborative electronic document;
    identifying a first revision identifier associated with a first change at the first coordinate location of the client model, wherein the first coordinate location corresponds to a second coordinate location within a second coordinate structure of a server model of the collaborative electronic document and a third coordinate location within a third coordinate structure of an attribution model associated with the collaborative electronic document;
    retrieving, from a data store, attribution information that is associated with the first revision identifier; and
    providing the attribution information to the client device in response to the attribution query.

2. The method of claim 1, wherein identifying the first revision identifier associated with the first change at the first coordinate location of the client model, comprises:
    identifying the attribution model comprising the third coordinate structure that corresponds to at least a portion of the first coordinate structure of the client model; and
    identifying, based on the first coordinate location of the client model, the first revision identifier at the third coordinate location of the third coordinate structure of the attribution model, wherein the third coordinate location corresponds to the first coordinate location of the client model.

3. The method of claim 2, wherein identifying, based on the first coordinate location of the client model, the first revision identifier at the third coordinate location of the third coordinate structure of the attribution model, comprises:
    identifying, among a plurality of revision identifiers for the third coordinate location of the third coordinate structure of the attribution model, a first most recent revision identifier, wherein the first revision identifier is the first most recent revision identifier.

4. The method of claim 1, further comprising:
    receiving, from the client device, an additional attribution query pertaining to the selected portion of the client model of the collaborative electronic document;
    identifying a second revision identifier associated with a second change at the first coordinate location of the client model;
    retrieving, from the data store, additional attribution information that is associated with the second revision identifier; and
    providing the additional attribution information to the client device in response to the additional attribution query.

5. The method of claim 2, further comprising:
    receiving, from the client device, a command indicating a change to the first coordinate structure of the client model of the collaborative electronic document;
    applying the change to the second coordinate structure of the server model of the collaborative electronic document, wherein the change to the first coordinate structure of the collaborative electronic document is associated with a second revision identifier; and
    modifying the third coordinate structure of the attribution model to reflect the change to the first coordinate structure of the client model, wherein a location of content of the attribution model is adjusted in view of the modified third coordinate structure of the attribution model.

6. The method of claim 1, wherein the attribution information comprises an indication of a user account associated with the first change and a timestamp associated with the first change.

7. The method of claim 2, wherein the third coordinate structure of the attribution model is smaller than the first coordinate structure of the client model and the second coordinate structure of the server model.

8. A system comprising:
    a memory; and
    a processing device, coupled to the memory, to perform operations comprising:
        receiving, from a client device, an attribution query pertaining to a selected portion of a client model of a collaborative electronic document, wherein the selected portion of the client model corresponds to a first coordinate location within a first coordinate structure of the client model of the collaborative electronic document;

identifying a first revision identifier associated with a first change at the first coordinate location of the client model, wherein the first coordinate location corresponds to a second coordinate location within a second coordinate structure of a server model of the collaborative electronic document and a third coordinate location within a third coordinate structure of an attribution model associated with the collaborative electronic document;

retrieving, from a data store, attribution information that is associated with the first revision identifier; and providing the attribution information to the client device in response to the attribution query.

9. The system of claim 8, wherein identifying the first revision identifier associated with the first change at the first coordinate location of the client model, comprises:

identifying the attribution model comprising the third coordinate structure that corresponds to at least a portion of the first coordinate structure of the client model; and identifying, based on the first coordinate location of the client model, the first revision identifier at the third coordinate location of the third coordinate structure of the attribution model, wherein the third coordinate location corresponds to the first coordinate location of the client model.

10. The system of claim 9, wherein identifying, based on the first coordinate location of the client model, the first revision identifier at the third coordinate location of the third coordinate structure of the attribution model, comprises:

identifying, among a plurality of revision identifiers for the third coordinate location of the third coordinate structure of the attribution model, a first most recent revision identifier, wherein the first revision identifier is the first most recent revision identifier.

11. The system of claim 8, the operations further comprising:

receiving, from the client device, an additional attribution query pertaining to the selected portion of the client model of the collaborative electronic document;

identifying a second revision identifier associated with a second change at the first coordinate location of the client model;

retrieving, from the data store, additional attribution information that is associated with the second revision identifier; and providing the additional attribution information to the client device in response to the additional attribution query.

12. The system of claim 9, the operations further comprising:

receiving, from the client device, a command indicating a change to the first coordinate structure of the client model of the collaborative electronic document;

applying the change to the second coordinate structure of the server model of the collaborative electronic document, wherein the change to the first coordinate structure of the collaborative electronic document is associated with a second revision identifier; and modifying the third coordinate structure of the attribution model to reflect the change to the first coordinate structure of the client model, wherein a location of content of the attribution model is adjusted in view of the modified third coordinate structure of the attribution model.

13. The system of claim 8, wherein the attribution information comprises an indication of a user account associated with the first change and a timestamp associated with the first change.

14. The system of claim 9, wherein the third coordinate structure of the attribution model is smaller than the first coordinate structure of the client model and the second coordinate structure of the server model.

15. A non-transitory computer-readable medium comprising instructions that, response to execution by a processing device, cause the processing device to perform operations comprising:

receiving, from a client device, an attribution query pertaining to a selected portion of a client model of a collaborative electronic document, wherein the selected portion of the client model corresponds to a first coordinate location within a first coordinate structure of the client model of the collaborative electronic document;

identifying a first revision identifier associated with a first change at the first coordinate location of the client model, wherein the first coordinate location corresponds to a second coordinate location within a second coordinate structure of a server model of the collaborative electronic document and a third coordinate location within a third coordinate structure of an attribution model associated with the collaborative electronic document;

retrieving, from a data store, attribution information that is associated with the first revision identifier; and providing the attribution information to the client device in response to the attribution query.

16. The non-transitory computer-readable medium of claim 15, wherein identifying the first revision identifier associated with the first change at the first coordinate location of the client model, comprises:

identifying the attribution model comprising the third coordinate structure that corresponds to at least a portion of the first coordinate structure of the client model; and identifying, based on the first coordinate location of the client model, the first revision identifier at the third coordinate location of the third coordinate structure of the attribution model, wherein the third coordinate location corresponds to the first coordinate location of the client model.

17. The non-transitory computer-readable medium of claim 16, wherein identifying, based on the first coordinate location of the client model, the first revision identifier at the third coordinate location of the third coordinate structure of the attribution model, comprises:

identifying, among a plurality of revision identifiers for the third coordinate location of the third coordinate structure of the attribution model, a first most recent revision identifier, wherein the first revision identifier is the first most recent revision identifier.

18. The non-transitory computer-readable medium of claim 15, the operations further comprising:

receiving, from the client device, an additional attribution query pertaining to the selected portion of the client model of the collaborative electronic document;

identifying a second revision identifier associated with a second change at the first coordinate location of the client model;

retrieving, from the data store, additional attribution information that is associated with the second revision identifier; and
providing the additional attribution information to the client device in response to the additional attribution query.

19. The non-transitory computer-readable medium of claim 16, the operations further comprising:
receiving, from the client device, a command indicating a change to the first coordinate structure of the client model of the collaborative electronic document;
applying the change to the second coordinate structure of the server model of the collaborative electronic document, wherein the change to the first coordinate structure of the collaborative electronic document is associated with a second revision identifier; and
modifying the third coordinate structure of the attribution model to reflect the change to the first coordinate structure of the client model, wherein a location of content of the attribution model is adjusted in view of the modified third coordinate structure of the attribution model.

20. The non-transitory computer-readable medium of claim 15, wherein the attribution information comprises an indication of a user account associated with the first change and a timestamp associated with the first change.

* * * * *